US006897918B1

(12) United States Patent
Nonaka et al.

(10) Patent No.: US 6,897,918 B1
(45) Date of Patent: May 24, 2005

(54) COLOR FILTER WITH PROTRUSION

(75) Inventors: Harushi Nonaka, Shiga (JP);
Takayoshi Akamatsu, Shiga (JP);
Keijiro Inoue, Shiga (JP); Shuichi Hariguchi, Kyoto (JP); Tadashi Shigemitsu, Shiga (JP)

(73) Assignee: Toray Industries, Inc., Tokyo (JP)

( * ) Notice: Subject to any disclaimer, the term of this patent is extended or adjusted under 35 U.S.C. 154(b) by 83 days.

(21) Appl. No.: 09/662,851

(22) Filed: Sep. 15, 2000

(51) Int. Cl.⁷ .................... G02F 1/1333; G02F 1/1335; G02F 1/1339; G02F 1/1337

(52) U.S. Cl. ................ 349/106; 349/110; 349/155; 349/129; 349/130

(58) Field of Search .................. 349/106, 110, 349/111, 155, 130, 156, 123, 129

(56) References Cited

U.S. PATENT DOCUMENTS

| 3,834,794 A | 9/1974 | Soref ..................... 349/141 |
| 4,618,514 A | 10/1986 | McClelland et al. ........ 349/123 |
| 4,678,284 A | 7/1987 | Tashiro ..................... 349/155 |

(Continued)

FOREIGN PATENT DOCUMENTS

| DE | 3234110 A1 | 3/1983 |
| EP | 0 113 064 | 7/1984 |
| EP | 0 483 693 | 10/1991 |
| EP | 0 497 370 | 8/1992 |
| EP | 0 622 644 | 9/1993 |
| EP | 0 644 452 | 9/1994 |
| EP | 97307643.3 | 1/1998 |
| JP | 63-056625 | 11/1988 |
| JP | 04-060517 A | * 2/1992 |
| JP | 04-119329 A | * 4/1992 |
| JP | 4-318816 | 11/1992 |
| JP | 05-002163 | 8/1993 |
| JP | 7-199193 | 8/1995 |
| JP | 07-318950 | 8/1995 |
| JP | 11-242225 | 9/1999 |
| JP | 11-248921 A | * 9/1999 |
| JP | 11-248921 | 9/1999 |
| WO | WO 86/05283 | 9/1986 |
| WO | WO 96/18130 | 6/1996 |

OTHER PUBLICATIONS

Y. Taniguchi et al., 2000 "An Ultra–High–Quality MVA–LCD Using a New Multi–Layer CF Resin Spacer and Black–Matrix" Society for Information Display International Symposium Digest of Technical Papers 31:378–381.

(Continued)

Primary Examiner—Tarifur R. Chowdhury
(74) Attorney, Agent, or Firm—Morrison & Foerster LLP

(57) ABSTRACT

This invention provides a color filter which comprises, a transparent substrate, color layers of plural colors, a transparent electrode and a protrusion for controlling liquid crystal alignment laminated in this order, and also has plural fixed dot spacers. In a preferable embodiment of this invention, the black matrix is formed by partially overlapping the color layers and the topmost layer of the fixed dot spacers comprises portions of the layer which constitutes the protrusion for controlling liquid crystal alignment or it comprises separate dots of the same composition as that of the protrusion for controlling liquid crystal alignment.

This invention can provide a liquid crystal display device that can achieve an excellent display quality and a wide viewing angle and is furthermore excellent in productivity.

23 Claims, 12 Drawing Sheets

U.S. PATENT DOCUMENTS

| | | | |
|---|---|---|---|
| 4,682,858 A | | 7/1987 | Kanbe et al. ................ 349/156 |
| 4,876,165 A | | 10/1989 | Brewer et al. .................. 430/7 |
| 5,470,943 A | | 11/1995 | Sakata et al. ................ 528/353 |
| 5,492,762 A | | 2/1996 | Hirai et al. .................. 428/447 |
| 5,680,187 A | | 10/1997 | Nagayama et al. ......... 349/110 |
| 5,706,064 A | | 1/1998 | Fukunaga et al. ............. 349/43 |
| 5,760,857 A | | 6/1998 | Yanagawa et al. ............. 349/43 |
| 5,815,232 A | | 9/1998 | Miyazaki et al. ............ 349/155 |
| 5,831,701 A | * | 11/1998 | Matsuyama et al. ......... 349/110 |
| 5,841,498 A | | 11/1998 | Baur et al. ................... 349/141 |
| 5,917,572 A | | 6/1999 | Kurauchi et al. ............ 349/156 |
| 5,953,087 A | | 9/1999 | Hoyt ............................ 349/58 |
| 5,978,061 A | | 11/1999 | Miyazaki et al. ............ 349/155 |
| 6,097,467 A | * | 8/2000 | Fujimaki et al. ............. 349/141 |
| 6,222,602 B1 | | 4/2001 | Aratani et al. ............... 349/141 |
| 6,275,280 B1 | * | 8/2001 | Kajita et al. ................ 349/155 |
| 6,327,016 B1 | * | 12/2001 | Yamada et al. ............. 349/123 |
| 6,335,780 B1 | * | 1/2002 | Kurihara et al. ............. 349/156 |
| 6,525,791 B1 | * | 2/2003 | Tsuda et al. ................. 349/106 |

OTHER PUBLICATIONS

A. Takeda et al., 1998 "A Super–High–Image–Quality Multi–Domain Vertical Alignment LCD by New Rubbing–Less Technology" Society for Information Display International Symposium Digest of Technical Papers 29:1077–1080.

Y. Koike et al., 1997 "A Vertically Aligned LCD Providing Super–High Image Quality" Proceedings of the International Display Workshops 1997 159–162.

European Search Report dated Jan. 29, 1998.

H. Yamashita et al. :P–48: Precise Cell–Thickness Control by Spacer–Ball–Free Structure and Its Application to Large–Size–TFT–LCDs, Sid International Symposium, Digest of Technical Papers, San Diego, May 1996, vol. 12, pp. 600–602.

* cited by examiner

COLOR FILTER WITH PROTRUSION

TECHNICAL FIELD

This invention relates to a color filter having a protrusion for controlling liquid crystal alignment and a fixed spacer, and a liquid crystal display device using it.

BACKGROUND ART

The cell structure of a conventional color liquid crystal display device is basically composed of a substrate having a color filter and an opposite substrate having a conductive film formed on a transparent substrate such as a TFT array substrate. The color filter is usually produced, for example as disclosed in JP-B02-1311, by forming at first a black matrix on a transparent substrate, then forming pixels of red (R), green (G) and blue (B), and further forming on them transparent electrodes necessary for driving the liquid crystal in an electric field. As required, a transparent protective layer is formed between the pixels and the transparent electrodes.

The black matrix refers to the light screening regions disposed between the respective pixels, to improve the contrast of display in the display device, and to prevent the mal-function caused by the light incident on any active element such as TFT. Usually, the black matrix is formed by patterning a metal such as chromium or nickel or any of the oxides thereof, etc. laminated on a transparent substrate, or a mixture consisting of a light screening agent and a resin.

For assembling the cells, an alignment layer is formed on the transparent electrodes and is rubbed for aligning the liquid crystal, and the intermediate product is sent to the cell-assembling step, and is joined with an opposite substrate. Then, the liquid crystal is filled.

Furthermore, in recent years, liquid crystal display devices have become larger, or are being increasingly used as monitors. In this situation, they are demanded to be wider in viewing angle. Though the conventional TN system uses positive liquid crystal, VA (vertically alignment) liquid crystal display devices using negative liquid crystal are being developed, and furthermore, MVA (multi-domain vertical alignment) liquid crystal display devices have been developed as an improved version of VA (for example, Society for Information Display International Symposium Digest of Technical Papers, Volume XXIX, p. 1077~1080). The MVA liquid crystal display devices are characterized by a wide viewing angle, and to divide the alignment on the pixels of the color filter, protrusions are provided on the surfaces of the TFT substrate and the color filter substrate, for controlling the liquid crystal aligning directions. In this system, the design of the protrusion for controlling liquid crystal alignment is technically important.

OBJECT OF THE INVENTION

In general, in a liquid crystal display, in order to keep the thickness of the liquid crystal layer (cell gap), plastic beads, glass beads or glass fibers are held as spacers between the two substrates of the liquid crystal display device. The spacers such as plastic beads are sprayed in an air current, but it happens that the spacers such as plastic beads are not uniformly sprayed to be mal-distributed due to the influence of the air current and the static electricity during the spraying. If spacers are mal-distributed, cell gap irregularity occurs to disadvantageously lower the display quality.

Furthermore, according to this spraying method, since the positions of the spacers cannot be precisely controlled, there is another problem that the spacers are present also in the display regions (light transmitting portions in the screen excluding the black matrix portions) on the substrates of the liquid crystal display, to lower the display quality of the liquid crystal display device due to the light scattering by the spacers.

Furthermore, the MVA liquid crystal display device has a problem that since the protrusion for controlling liquid crystal alignment is formed on the color filter, the color filter becomes uneven on the surface, and therefore that in the conventional spacer spraying method not allowing precise positioning of the spacers, it is difficult to obtain a sufficiently uniform cell gap. Moreover, when a black matrix is formed by partially overlapping the adjacent color layers without using the above black matrix for process simplification and cost reduction, there is a problem that the black matrix regions project, making it difficult to obtain a uniform cell gap.

On the other hand, for keeping the cell gap, JP-A-03-140324, 63-824054, 04-93924 and 05-196946 propose a liquid crystal display using spacers formed by overlapping the different color layers forming the color filter. However, in these techniques, in either TN system or MVA system having transparent electrodes as the topmost layer of the spacer color filter, the opposite substrate must be specially designed to avoid the electric short-circuits between the transparent electrodes and the opposite substrate. That is, since transparent electrodes are present also as the topmost layer of the spacers formed by overlapping color layers, it is necessary to prevent the electric short-circuits, and it can happen that this necessity restricts the design of the opposite substrate.

On the other hand, it is also proposed to form spacers on the transparent electrodes as an independent layer separate from the color layers for avoiding the structure of overlapping color layers. However, this method has a large problem in view of productivity that an additional photolithographic step is needed in the production of a color filter.

The object of this invention is to provide a color filter for an MVA liquid crystal display device excellent in display quality and wide in viewing angle.

DISCLOSURE OF THE INVENTION

The inventors studied intensively any means for solving the above problems, and as a result, found that the above object can be achieved by forming the topmost layer of each of the spacers for fixing the cell gap simultaneously when forming the protrusion for controlling liquid crystal alignment.

This invention provides a color filter which comprises, a transparent substrate, color layers of plural colors, a transparent electrode and a protrusion for controlling liquid crystal alignment laminated in this order, and also has plural fixed dot spacers. In a preferable embodiment of this invention, the topmost layer of the fixed dot spacers comprises portions of the layer which constitutes the protrusion for controlling liquid crystal alignment, or it comprises separate dots of the same composition as that of the protrusion for controlling liquid crystal alignment.

Meanings of Symbols

Figure 1:
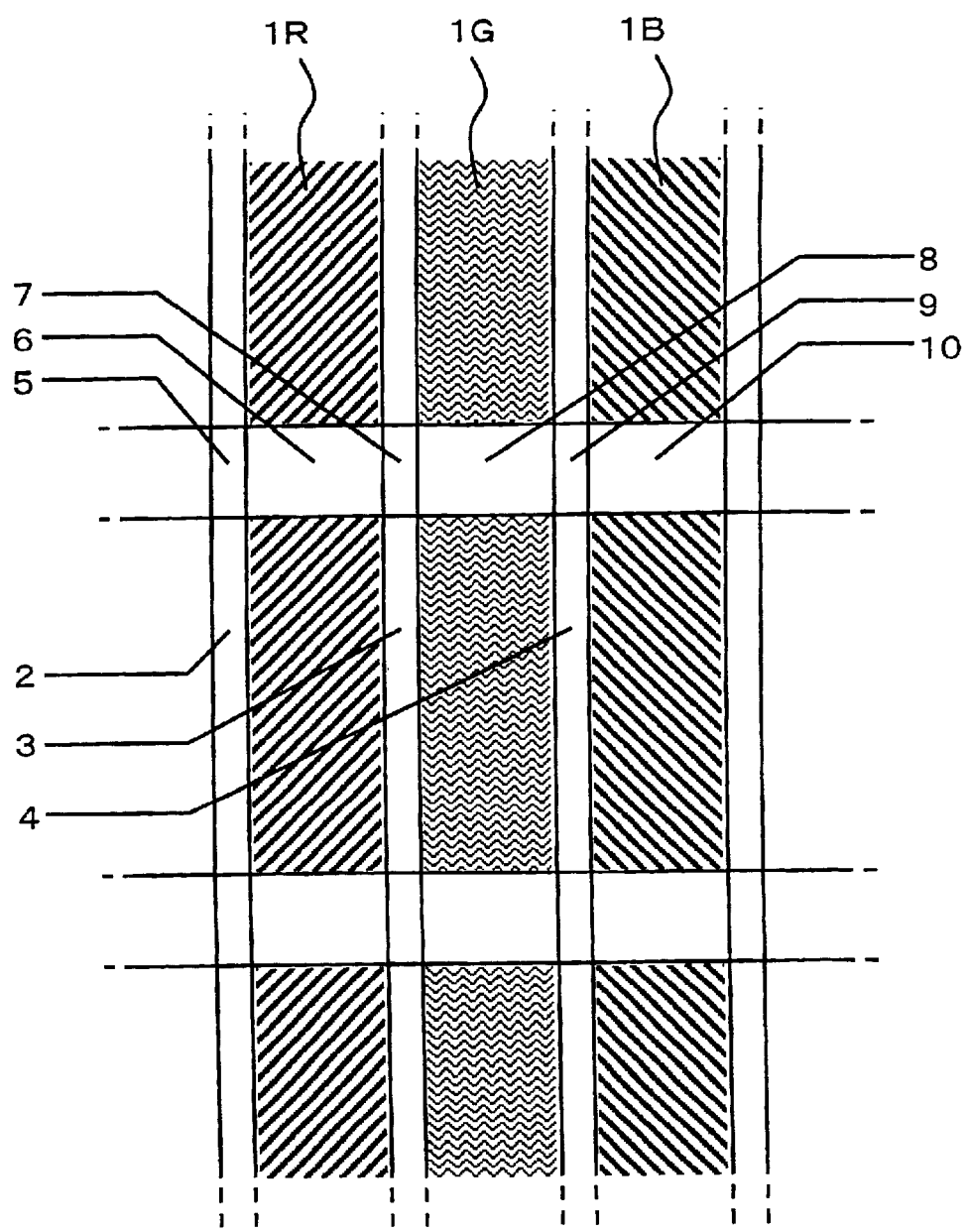
FIG. 1 is a schematic plan view showing an example of the coating pattern of color layers in this invention.

1: pixel region (red (1R), green (1G), blue (1B))

2~10 and 12~17: black matrix region

11: protrusion for controlling liquid crystal alignment

15: three color-overlaid black matrix

20: fixed dot spacer formed by color layers

18: spacer made of the same material as that of protrusion for controlling liquid crystal alignment

DETAILED DESCRIPTION OF THE INVENTION

This invention is described below in more detail.

The transparent substrate used for the color filter of this invention is not especially limited, and can be preferably a film or sheet, etc. made of an inorganic glass such as quartz glass, borosilicate glass, aluminosilicate glass or soda lime glass coated on the surface with silica, or of an organic plastic material.

For the purposes of improving the contrast of the liquid crystal display device and preventing the mal-function of active elements, a black matrix is formed. In this invention, it is also a preferable mode, to form the black matrix by overlapping different color layers, for decreasing one lithographic step.

A case of forming the black matrix as an independent layer is described below. The black matrix can be formed by a metal such as chromium or nickel or any of the oxides thereof, but it is preferable in view of production cost and waste disposal cost, to form a resin black matrix consisting of a resin and a light screening agent. Furthermore, also for keeping the spacers of this invention higher, the use of a resin black matrix is preferable. In this case, the resin used as the black matrix is not especially limited, but can be preferably a photosensitive or non-photosensitive material such as an epoxy resin, acrylic resin, urethane resin, polyester resin, polyimide resin or polyolefin resin. It is preferable that the black matrix of this invention is made of a finely processable, thermally stable and mechanically strong resin.

So, the use of an acrylic resin, polyimide resin or epoxy resin is especially preferable. Furthermore, it is preferable that the black matrix resin is higher in heat resistance than the resins used for the pixels and the protective film, and is resistant against the organic solvent used in the steps downstream of the black matrix formation. So, a polyimide resin is especially preferable.

The polyimide resin is not especially limited, but usually a polyimide resin obtained by imidating a polyimide precursor mainly composed of the structural component represented by the following general formula by heating or by using a proper catalyst can be suitably used.

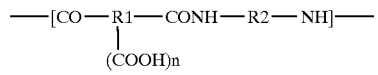

In the above general formula, n denotes a numeral of 1~2, and R1 denotes an acid component residue which is a trivalent or tetravalent organic group having at least two carbon atoms. In view of heat resistance, it is preferable that R1 is a trivalent or tetravalent group containing a cyclic hydrocarbon or aromatic ring or aromatic heterocyclic ring and having 6 to 30 carbon atoms. The groups which can be used as R1 include groups derived from a phenyl group, biphenyl group, tert-phenyl group, naphthalene group, perylene group, diphenyl ether group, diphenyl sulfone group, diphenyl propane group, benzophenone group, biphenyl trifluoropropane group, cyclobutyl group, cyclopentyl group, etc., though not limited thereto.

R2 denotes a divalent organic group having at least two carbon atoms. In view of heat resistance, it is preferable that R2 is a divalent group containing a cyclic hydrocarbon, aromatic ring or aromatic heterocyclic ring and having 6 to 30 carbon atoms. The groups which can be used as R2 include groups derived from a phenyl group, biphenyl group, tert-phenyl group, naphthalene group, perylene group, diphenyl ether group, diphenyl sulfone group, diphenyl propane group, benzophenone group, biphenyl trifluoropropane group, diphenyl methane group, cyclohexylmethane group, etc., though not limited thereto. In the polymer in which the structural component represented by the general formula (1) is a main component, R1 and R2 can be respectively one of the foregoing, but can also consist of two or more respectively, to form a copolymer.

It is especially preferable that the acrylic resin is a resin obtained by polymerizing about three to five monomers selected from acrylic acid, methacrylic acid, alkyl acrylates such as methyl acrylate and alkyl methacrylates such as methyl methacrylate, cyclic acrylates, cyclic methacrylates, hydroxyethyl acrylate, hydroxyethyl methacrylate, etc. to about 5000 to 20000 in molecular weight. The acrylic resin can be either photosensitive or non-photosensitive, but in view of higher fine processability, a photosensitive material can be preferably used. In the case of a photosensitive resin, a composition consisting of an acrylic resin, photopolymerizable monomer and photopolymerization initiator can be preferably used. The photopolymerizable monomers that can be used here include bi-functional monomers, tri-functional monomers and poly-functional monomers. The bi-functional monomers include 1,6-hexanediol diacrylate, ethylene glycol diacrylate, neopentyl glycol diacrylate, triethylene glycol acrylate, etc. The tri-functional monomers include trimethylolpropane triacrylate, pentaerythritol triacrylate, tris(2-hydroxyethyl)isocyanate, etc. The polyfunctional monomers include ditrimethylolpropane tetraacrylate, dipentaerythritol pentaacrylate, dipentaerythritol hexaacrylate, etc. The photopolymerization initiator can be one or more as a mixture selected from benzophenone, thioxanthone, imidazole, triazines, etc.

The light screening agent used for the black matrix can be carbon black, metal oxide powder of titanium oxide or triiron tetraoxide, etc., metal sulfide powder or metal powder or mixture of red, blue, green and other pigments, etc. Among them, carbon black is especially preferable since it has excellent light screening capability. Since well-dispersed carbon black with a small grain size mainly shows a brownish tone, it is preferable to add a pigment of a color complementary to the color of carbon black, for achieving achromatic color.

If the resin used for the black matrix is a polyimide, the suitably usable black paste solvent is an amide based polar solvent such as N-methyl-2-pyrrolidone, N,N-dimethylacetoamide or N,N-dimethylformamide, or a lactone based polar solvent such as γ-butyrolactone, etc.

For dispersing the light screening agent consisting of carbon black, a pigment of a color complementary to the color of carbon black, etc., for example, the following method can be used: the light screening agent, dispersing agent, etc. are mixed in a polyimide precursor solution, and the mixture is dispersed by a dispersing machine such as a three-roll mill, sand grinder or ball mill, though the method is not limited thereto. Furthermore, for improving the dispersibility, coatability and leveling of carbon black, various additives can also be added.

A resin black matrix can be formed by coating a transparent substrate with a black paste, drying and patterning. The black paste can be applied by any suitable method such as dipping or using a roll coater, spinner, die coater or wire coater, etc., and heated and dried (semi-cured) using an oven or hot plate. The semi-curing conditions depend on the resin and solvent used and the coating amount of the paste, but it is usually preferable to heat at 60 to 200° C. for 1 to 60 minutes.

The black paste film obtained like this gets a photoresist film formed on it if the resin is a non-photosensitive resin, or gets no film or an oxygen blocking film formed if the resin is a photosensitive resin, then being exposed and developed. As required, the positive photoresist film or oxygen blocking film is removed, and the black paste film is heated and dried (regularly cured) again. The regular curing conditions depend to some extent on the coating amount if the polyimide resin is obtained from a precursor, but generally the black paste film is heated at 200 to 300° C. for 1 to 60 minutes. In the case of an acrylic resin, for regular curing, the black paste film is generally heated at 150 to 300° C. for 1 to 60 minutes. Thus, a black matrix is formed on the substrate.

A resin black matrix can also be formed by a transfer method. The color layers described later can also be overlapped to form the black matrix.

It is preferable that the thickness of the resin black matrix film is 0.5 to 2.0 μm. A more preferable range is 0.8 to 1.5 μm. If the film thickness is thinner than 0.5 μm, it is difficult to form sufficiently high spacers when the spacers are formed by laminating a resin layer on the resin black matrix. Furthermore the light screening capability becomes insufficient unpreferably. On the other hand, if the thickness is thicker than 2.0 μm, the flatness of the color filter is likely to be sacrificed and level differences are likely to be formed though sufficient light screening capability can be obtained.

The light screening capability of a resin black matrix is expressed by an OD value (the common logarithm of the inverse number of the transmittance). To improve the display quality of the liquid crystal device, it is preferable that the OD value is 1.0 or more. More preferable is 2.0 or more. The suitable range in the thickness of the resin black matrix is described above, and the upper limit of the OD value should be decided in relation with it.

In a case where no independent black matrix layer is formed, at first, color layers are laminated on a transparent substrate. A color filter is composed of many picture elements, each of which is a pixel usually formed by the respective color layers of three primary colors. As the three primary colors, usually red (R), green (G) and blue (B), or cyan (C), magenta (M) and yellow (Y) are used, and each pixel is formed by the three color layers.

The colorants suitably used in the color layers are organic pigments, inorganic pigments or dyes, etc., and furthermore, various additives such as an ultraviolet light absorber, dispersing agent and leveling agent can also be added. As pigments, for red (R), Color Index Nos. 9, 97, 122, 123, 144, 149, 166, 168, 177, 180, 192, 209, 215, 216, 224, 254, etc. are generally used. For green (G), Color Index Nos. 7, 10, 36, 37, 38, 47 etc. are generally used. For Blue (B), Color index Nos. 15, 15:1, 15:2, 15:3, 15:4, 15:6, 16, 17, 21, 22, 60, 64, etc. are generally used. The dispersing agent used can be selected from a wide range including surfactants, intermediate products of pigments, intermediate products of dyes and high molecular dispersing agents.

The resin used for the color layers is not especially limited, and any of the resins enumerated above for the black matrix can be used.

For forming a color layer, a paste containing a colorant is applied onto a substrate, dried and patterned. For obtaining a color paste with a colorant dispersed or dissolved, a resin and a colorant are mixed in a solvent, and the mixture is dispersed by a dispersing machine such as a three-roll mill, sand grinder or ball mill, though the method is not limited thereto.

The color paste can be applied by any suitable method such as dipping or using a roll coater, spinner, die coater, wire bar coater, etc., and subsequently heated and dried (semi-cured) using an oven or hot plate. The semi-curing conditions depend on the resin and solvent used and the coating amount of the paste, but it is usually preferable to heat at 60 to 200° C. for 1 to 60 minutes. The color layer can also be formed by a transfer method.

The color paste film obtained like this gets a photoresist film formed on it if the resin is a non-photosensitive resin, or gets, as required, an oxygen blocking film formed if the resin is a photosensitive resin, then being exposed and developed. The photoreslst film and the oxygen blocking film are removed, and the color paste film is heated and dried (regularly cured).

The regular curing conditions depend to some extent on the coating amount if the polyimide resin is obtained from a precursor, but the color paste film is generally heated at 200 to 300° C. for 1 to 60 minutes. In the case of an acrylic resin, for regular curing, the color paste film is generally heated at 150 to 300° C. for 1 to 60 minutes. With this process, a patterned color layer is formed on the substrate.

As a preferred embodiment of the color filter of this invention, the plural color layers are partially overlapped to form the black matrix (hereinafter called, color-overlaid black matrix). After a color layer of the first color is formed on the entire surface of a transparent substrate as described above, the unwanted regions are removed by photolithography, to form a desired pattern of the first color layer. Then, similar operation is repeated, to form a color pattern of the second color and a color pattern of the third color. At this time, the color layers are partially overlapped to form the black matrix. That is, the overlaid portions become the black matrix.

The color-overlaid black matrix is formed by overlaying two or three color layers. That is, the entire black matrix can be formed by overlaying two color layers, or the entire black matrix can also be formed by overlaying three color layers. Furthermore, some regions of the black matrix can be formed by overlaying two colors layers while the other regions of the black matrix can be formed by overlaying three color layers. However, in view of liquid crystal filling capability, it is preferable that the area rate of the two-color-overlaid black matrix in the entire black matrix is 50% or more. More preferable is 75% or more. If the two-color-overlaid black matrix rate is more than the above value, the liquid filling time can be shortened and it is preferable that fewer bubbles remain.

The pattern of the black matrix is formed to fill the clearances between patterned pixels, and can be stripes, lattice or zigzag lattice, etc. and is not especially limited. However, for enhancing the light screening capability in the clearances between pixels, a lattice pattern is most preferable.

The black matrix formed by overlaying colors of this invention is preferable especially in view of production cost, since one photolithographic step can be decreased compared to a case of forming the black matrix as an independent layer.

It is preferable that the thickness of a color layer is 0.5 to 3.0 $\mu$m. A more preferable range is 1.0 to 2.5 $\mu$m, and a further more preferable range is 1.5 to 2.0 $\mu$m.

It is preferable that the color-overlaid width is 2 to 60 $\mu$m. A more preferable range is 5 to 45 $\mu$m, and a further more preferable range is 10 to 30 $\mu$m. The color-overlaid width is the color-overlaid black matrix width. If the color-overlaid width is narrower than this range, the color-overlaying accuracy becomes insufficient, making it difficult to form a perfect black matrix. If the color-overlaid width is wider than this range, the numerical aperture becomes small, to lower the transmittance in a liquid crystal panel, and a problem that panel luminance is likely to be insufficient is likely to occur. Even if the black matrix is formed as an independent layer, it is preferable that the black matrix width is 2 to 60 $\mu$m as in the case of color-overlaid black matrix. A more preferable range is 5 to 45 $\mu$m, and a further more preferable range is 10 to 30 $\mu$m.

It is preferable that the overall film thickness of the color-overlaid black matrix is 1.0 to 9.0 $\mu$m. A more preferable range is 2.0 to 7.5 $\mu$m, and a further more preferable range is 3.0 to 6.0 $\mu$m. If the film thickness is thinner than 1.0 $\mu$m, it is difficult to form sufficiently high spacers, and it is unpreferable that the light screening capability becomes insufficient. On the other hand, if the film thickness is thicker than 9.0 $\mu$m, the flatness of the color filter is likely to be sacrificed to cause level differences and it is unpreferable that the display irregularity is likely to occur, though sufficiently high spacers can be formed.

The light screening capability of the color-overlaid black matrix is expressed by an OD value. To improve the display quality of the liquid crystal display device, it is preferable that the OD value is 1.0 or more. More preferable is 2.0 or more. To make the OD value of the color-overlaid black matrix larger, it is more preferable that three color layers are overlaid. In the case of two color layers overlapped, it is preferable to combine blue and red, or cyan and magenta.

Within the black matrix formed as an independent layer or color-overlaid black matrix, usually (20–400) $\mu$m to (20–400) $\mu$m openings each consisting of one color layer are formed, and the openings function as pixels of respective colors. The pixels are arranged in triangles, mosaic or stripes, etc., and the arrangement is not especially limited.

It is preferable that the dimensional accuracy and the position accuracy of the openings in the black matrix are ±5 $\mu$m or less of the design dimensions and design positions of the openings. More preferable is ±3 $\mu$m or less, and further more preferable is ±2 $\mu$m or less. If the accuracy is higher than it, display defects such as light leak are less likely to occur. To achieve this accuracy, it is preferable to process at a color layer pattern accuracy of ±5 $\mu$m or less in the plane. Preferable is ±3 $\mu$m or less, and more preferable is ±2 $\mu$m or less. Furthermore, it is preferable that the positioning accuracy of respective color layers is also ±5 $\mu$m or less. More preferable is ±3 $\mu$m or less, and more preferable is ±2 $\mu$m or less.

Also at the periphery of the screen, it is preferable to similarly form the black matrix like a picture frame.

Then, as required, a transparent protective film can also be formed. The formation of the protective film increases the number of color filter production steps, and disadvantageously raise the production cost, but on the other hand, it is advantageous for controlling the spacer height, preventing the dissolving of impurities from the color filter, and flattening the surface. The thickness of the protective film is not limited, but it is preferable that the thickness is 0.05 to 2.0 $\mu$m. A more preferable range is 0.1 to 0.5 $\mu$m.

Then, transparent electrodes are formed. As the transparent electrodes, ITO, tin oxide or zinc oxide, etc. can be laminated by using such a method as vacuum evaporation, sputtering or CVD, etc.

The method for forming spacers on the black matrix formed as an independent-layer, not on the color-overlaid black matrix is described below.

As the method for forming spacers, it is preferable to form the spacers simultaneously with the color regions of pixels when the color layers are formed, in view of higher productivity and the possibility of forming sufficiently high spacers. That is, the color layers are laminated also on the spacer forming positions on the black matrix corresponding to the non-display regions. Of the three color layers, one to three layers are laminated, to ensure that a predetermined height can be secured when the topmost layer with the same chemical composition as that of the protrusion for controlling liquid crystal alignment is formed on the color layers. In this case, if the underlying layers of the laminated color layers are larger in area, it is advantageous for positioning and securing the height after completion of lamination. After three color layers are formed, as in the case of color-overlaid black matrix, a transparent protective layer is laminated as required, and furthermore transparent electrodes are laminated. In a case where the spacers can be as high as the protrusion for controlling liquid crystal alignment, that is, in a case where the protrusion for controlling liquid crystal alignment is allowed to partially or wholly contact the opposite substrate, or in a case where since a black matrix thicker than the color layers is formed below the spacers, the protrusion for controlling liquid crystal alignment does not contact the opposite substrate since the spacers become high even if the spacers and the protrusion for controlling liquid crystal alignment are simultaneously formed, the color layers are not required to be placed also on the spacer positions. That is, in this case, the spacers are formed as one layer like the protrusion for controlling liquid crystal alignment.

In this invention, the topmost layer of each of the spacers is formed simultaneously with the protrusion for controlling liquid crystal alignment after laminating the transparent electrodes. If the black matrix is formed as an independent layer, some portions of the protrusion for controlling liquid crystal alignment or spacers of the same material as that of the protrusion for controlling liquid crystal alignment are formed as the topmost layer of the spacers on said predetermined positions. In this case, some portions of the protrusion for controlling liquid crystal alignment express that the protrusion for controlling liquid crystal alignment formed on the pixels is extended without being interrupted, also to the positions destined to be the topmost portions of spacers.

In the case of color-overlaid black matrix, some portions of the protrusion for controlling liquid crystal alignment or spacers of the same material as that of the protrusion for controlling liquid crystal alignment are formed on the color-overlaid black matrix. That is, on the transparent electrodes on the black matrix formed by overlaying two or three color layers, some portions of the protrusion for controlling liquid crystal alignment may be formed to function as spacers, or a pattern of spacers of the same material as that of the protrusion for controlling liquid crystal alignment may be formed separately from the protrusion for controlling liquid crystal alignment when the protrusion for controlling liquid crystal alignment is formed. Of course, both can also be formed simultaneously; Furthermore, after a pattern of spacers by a third color layer is formed on a two-color-overlaid black matrix, transparent electrodes and some portions of the protrusion for controlling liquid crystal alignment or spacers of the same material as that of the protrusion for controlling liquid crystal alignment may also be formed on the spacer pattern.

The method of forming spacers using the protrusion for controlling liquid crystal alignment on the color-overlaid black matrix is easier in alignment work and more excellent in productivity than the method of forming the black matrix as an independent layer and laminating the spacer dot pattern on the black matrix while aligning. That is, the color-overlaid black matrix extends in lines and the topmost layer is only required to be disposed on the lines, and the alignment allowance is widened. If some portions of the protrusion for controlling liquid crystal alignment are used as the topmost layer of spacers, both the black matrix and the protrusion for controlling liquid crystal alignments are linear. So, their intersections become spacer positions, and the latitude of alignment is further widened.

Theoretically it is only required that the protrusion for controlling liquid crystal alignment is formed on the pixels, but as an example of the color filter of this invention, some of the protrusions for controlling liquid crystal alignment are formed also on the color-overlaid black matrix, to function as spacers. If a color-overlaid black matrix is used, the thickness of the black matrix increases. So, the alignment of liquid crystal is likely to be disordered on and near the black matrix, and divisional alignment irregularity and display irregularity are likely to occur. So, if the protrusion for controlling liquid crystal alignment is formed also on the black matrix, the disorder of alignment can be prevented, and the divisional alignment acts effectively (the alignment control force is intensified). So, the display characteristic becomes especially good. That is, it is more preferable to form a protrusion for controlling liquid crystal alignment not acting as spacers on the transparent electrodes on the black matrix.

The protrusion for controlling liquid crystal alignment is described below. As examples of the shape of the protrusions for controlling liquid crystal alignment, triangular, semicircular or trapezoidal continuous lines, or dots of triangular pyramids or cones with triangular section or cones with trapezoidal section can be suitably used. The shape of protrusions is not especially limited, as far as the liquid crystal molecules on the pixels can be aligned divisionally in two or more directions. For example, if a protrusion for controlling liquid crystal alignment is a stripe having a triangular or trapezoidal cross section, the liquid crystal can be aligned divisionally in two directions by the two slopes. If a protrusion for controlling liquid crystal alignment is like a triangular wave (doglegged polygonal line), the liquid crystal can be aligned divisionally in four directions. If a protrusion for controlling liquid crystal alignment is a pyramid, the number of divisionally aligning directions is the same as the number of its slopes. For example, in the case of a regular pyramid, the liquid crystal can be aligned divisionally in four directions. On the other hand, in the case of a cone, the liquid crystal can be aligned divisionally in infinite directions.

The material of the protrusion for controlling liquid crystal alignment is not especially limited, and can be the same as that of the resin used for the color layers. For example, photosensitive and non-photosensitive materials such as epoxy resins, acrylic resins, urethane resins, polyester resins, polyimide resins and polyolefin resins can be used. Among them, acrylic resins and polyimide resins are especially preferable in view of processability and mechanical strength. Apart from them, positive photoresists and negative photoresists can also be suitably used. Positive resists include main chain cleaved resists, resists consisting of a novolak resin and a naphtoquinonediazide based photosensitive material, chemically amplified resists, etc., and a mixture consisting of a cresol novolak resin and a naphthoquinonediazide based photosensitive material can be most preferably used. The light irradiated regions become soluble in alkalis to allow patterning. Negative resists include crosslinked resists and chemically amplified resists.

In view of pattern processability and mechanical strength, a material with a pigment dispersed in a resin is more preferable. As the pigment, an insulating white pigment is more preferable. For example, it is especially preferable to select, for example, from titanium oxide, silicon oxide, aluminum oxide, calcium carbonate, magnesium oxide, lead oxide, chromium oxide, iron oxide, zirconia and barium sulfate. For forming the protrusion, the same method as used for forming the color layer pattern can be used. On the other hand, if the protrusion for controlling liquid crystal alignment is required to block light, a light screening agent such as carbon black, metal oxide powder of titanium oxide or triiron tetraoxide, metal sulfide powder or metal powder, or a mixture of pigments of red, blue, green, etc. can be used. If light screening capability and insulation are required, fine particles of an insulating inorganic compound such as aluminum oxide, titanium oxide or iron oxide or carbon black covered on the surface with a resin can also be used. In the color filter of this invention, the topmost layer of spacers is arranged on the transparent electrode layer. So, if an electrically insulating material is selected as the material of the spacers, the short-circuit defect between the transparent conductive layer on the color filter and the opposite TFT electrode substrate can be avoided even when misalignment occurs when the TFT substrate is joined. The prevention of short-circuits is very effective in a liquid crystal display device with a high numerical aperture in which electrodes and wires are arranged densely. It is preferable that the volume resistance of the spacers is $10^7 \Omega \cdot cm$ or more. More preferable is $10^9 \Omega \cdot cm$ or more.

The amounts of the colorant and the light screening agent added to the resin used to form the protrusion for controlling liquid crystal alignment are not especially limited, but in view of pattern processability and mechanical strength, it is preferable that the ratio by weight of the resin: the colorant or light screening agent is 10:0~1:9.

It is preferable that the height of the protrusions for controlling liquid crystal alignment is 0.5 to 6 $\mu$m. A more preferable range is 0.6 to 3 $\mu$m. If the protrusion height is less than 0.5 $\mu$m, the divisionally aligning effect is not sufficient unpreferably. On the other hand, if the protrusion height s more than 6 $\mu$m, coating irregularity occurs, and it becomes difficult to form protrusions by photolithography. Furthermore, filling liquid crystal is unpreferably disturbed. Moreover, when a color-overlaid black matrix is adopted, it is preferable that the height of the protrusions for controlling liquid crystal alignment is higher than the thickness of the color layers, in view of liquid crystal filling capability. It is preferable that the ratio of both (height of protrusions for controlling liquid crystal alignment/thickness of color layers) is 1.0 or more. More preferable is 1.2 or more.

The form the dot (contact point) or of the cross section obtained by cutting around the topmost portion of the spacer at a plane parallel to the substrate is not especially limited, but a circle, ellipsoid, polygon (for example, square), cross, T shape, L shape or doglegged form is preferable.

It is preferable that the height of the spacers is 1 to 9 $\mu$m. A more preferable range is 2 to 8 $\mu$m. If the height of the spacers is less than 1 $\mu$m, it is difficult to secure a sufficient cell gap. On the other hand, if more than 9 $\mu$m, the cell gap of the liquid crystal display device becomes so large as to raise the voltage required for driving unpreferably. The height of the spacers means the level difference between the pixel in each aperture of the color filter and the topmost surface of the spacer adjacent to it. If the level in a pixel is irregular, the maximum level difference measured from the pixel is the height of the spacer.

The area and location of each spacer is greatly affected by the structure of the liquid crystal display device. In a color filter having fixed spacers, due to the restriction in the area of the non-display region in each pixel, it is preferable that the area of each spacer in the screen is 10 to 1500 $\mu$m$^2$. A more preferable range is 20 to 800 $\mu$m$^2$, and a further more preferable range is 100 to 500 $\mu$m$^2$. If the area of each spacer is smaller than 10 $\mu$m$^2$, it is difficult to form or laminate a precise pattern, and it can happen that the spacers are destroyed by the pressure applied when the liquid crystal display device is produced. If the area of each spacer is larger than 1500 $\mu$m$^2$, the alignment is disordered in the vicinity of the spacers, to cause display irregularity. Furthermore, it becomes difficult to arrange the spacers in the screen only on the black matrix (non-display regions), and a problem that bubbles are generated at a low temperature occurs unpreferably. The spacer area in this case means the area of the contact between a spacer as a portion of the protrusion for controlling liquid crystal alignment formed on the color filter or a spacer of the same material as that of the protrusion for controlling liquid crystal alignment and the underlying color-overlaid black matrix or the spacer formed by the color layers formed on the black matrix. That is, it is the bottom area of each spacer in the topmost layer. It is preferable that the number of spacers is 0.1 to 10 per pixel. A more preferable range is 0.2 to 3.

Moreover, in order that the clearance kept by the spacers between the two substrates of the liquid crystal display device may be kept uniform in the screen, it is preferable to form spacers also on the peripheral black matrix at the periphery of the screen and on the non-display regions outside the screen. The spacers outside the screen and on the peripheral black matrix do not appear in the display regions. So, it is preferable that the area of each spacer outside the screen or on the peripheral black matrix is equal to or larger than the area of each spacer in the screen, to facilitate the formation of spacers.

Preferred examples of the color filter of this invention are described below.

(a) A color filter, having one to three color layers laminated on a black matrix formed as ad independent layer, and further having transparent electrodes and the outermost layer of the fixed dot spacers made of the same material as that of a protrusion for controlling liquid crystal alignment laminated. In this specification, the term "dot spacer" means that the spacer of which topmost portion contacts with opposite surface at a dot and the dot spacer includes other layers supporting the topmost layer on the substrate under and around the dot.

(b1) A color filter, having a black matrix formed by partially overlapping two color layers, and having transparent electrodes and spacers as portions of a protrusion for controlling liquid crystal alignment formed on the black matrix in this order.

(b2) A color filter, having a black matrix formed by partially overlapping two color layers, and having transparent electrodes and fixed dot spacers of the same material as a protrusion for controlling liquid crystal alignment formed on the black matrix in this order.

(c1) A color filter having a black matrix formed by partially overlapping two color layers, and having a third color layer as a spacer pattern, transparent electrodes and spacers as portions of a protrusion for controlling liquid crystal alignment formed on the black matrix in this order.

(c2) A color filter having a black matrix formed by partially overlapping two color layers, and having a third color layer as a spacer pattern, transparent electrodes and spacers of the same material of a protrusion for controlling liquid crystal alignment formed on the black matrix in this order.

(d1) A color filter having a black matrix formed by partially overlapping two and three color layers, and having transparent electrodes and spacers as portions of a protrusion for controlling liquid crystal alignment formed on the black matrix formed by overlapping three color layers, in this order.

(d2) A color filter having a black matrix formed by partially overlapping two and three color layers, and having transparent electrodes and spacers of the same material as that of a protrusion for controlling liquid crystal alignment formed on the black matrix formed by overlapping three color layers, in this order.

In the color filter according to c1, c2, d1 or d2, the transparent electrodes and the protrusion for controlling liquid crystal alignment not acting as the spacers can be formed on the black matrix by overlapping two color layers. This color filter is especially preferable, since it is less disordered in alignment on and near the black matrix, large in the alignment control force by the protrusions for controlling liquid crystal alignment and less in display irregularity.

(e1) A color filter having a black matrix formed by partially overlapping three color layers, and having transparent electrodes and spacers as portions of a protrusion for controlling liquid crystal alignment formed on the black matrix in this order.

(e2) A color filter having a black matrix formed by partially overlapping three color layers, and having transparent electrodes and spacers of the same material as that of a protrusion for controlling liquid crystal alignment formed on the black matrix n this order.

The spacer pattern of the third color layer is narrower than the color-overlaid black matrix in width and becomes a base for forming the spacers formed as portions of the overlying protrusion for controlling liquid crystal alignment, and since it does not have a sufficient light screening area, it is different from the black matrix. If the spacers of the same material as that of the protrusion for controlling liquid crystal alignment are formed, the spacer pattern of color layers is not formed, but transparent electrodes are directly laminated on the black matrix, being followed by the formation of the spacers.

An example of the method for producing an electrode substrate with TFT elements is described below. A thin chromium film is formed on a non-alkaline glass substrate, and gate electrodes are patterned by photolithography. Then, a silicon nitride film as an insulation film, an amorphous silicon film and a silicon nitride film as an etching stopper are continuously formed by plasma CVD. Subsequently, the silicon nitride film as an etching stopper is patterned by photolithography. An n+ amorphous silicon film for the ohmic contact between TFT terminals and metal electrodes is formed and patterned. At this time, the amorphous silicon film as a channel layer is also patterned simultaneously. Furthermore, an ITO film destined to be display electrodes is patterned. Moreover, aluminum as a wiring material is attached as a film by sputtering, and signal wires and TFT metal electrodes are prepared by photolithography. With drain electrodes and source electrodes as masks, the n+ amorphous silicon film in the channel area is etched away, to obtain an electrode substrate with TFT elements. In the case of reflection type liquid crystal display elements, it is preferable that the display electrodes are made of a material with high reflectance such as aluminum or silver. It is also preferable to let the opposite electrode substrate have protrusions for controlling liquid crystal alignment in correspondence to the protrusions for controlling liquid crystal alignment formed on the color filter. Also on the electrode substrate, spacers for uniformizing the cell gap can be formed.

The panel assembling is described below. At first, an alignment layer is formed on the color filter, and similarly, also on the opposite electrode substrate with TFT elements, an alignment layer is formed. The two substrates are joined with a sealant such as an epoxy adhesive, and from the injection ports formed in the sealed portion, the liquid crystal to be vertically aligned is filled. After completion of filling liquid crystal, the injection ports are closed, and a polarizing plate is stuck in outside the substrate, for preparing a liquid crystal display device.

Figure 2:
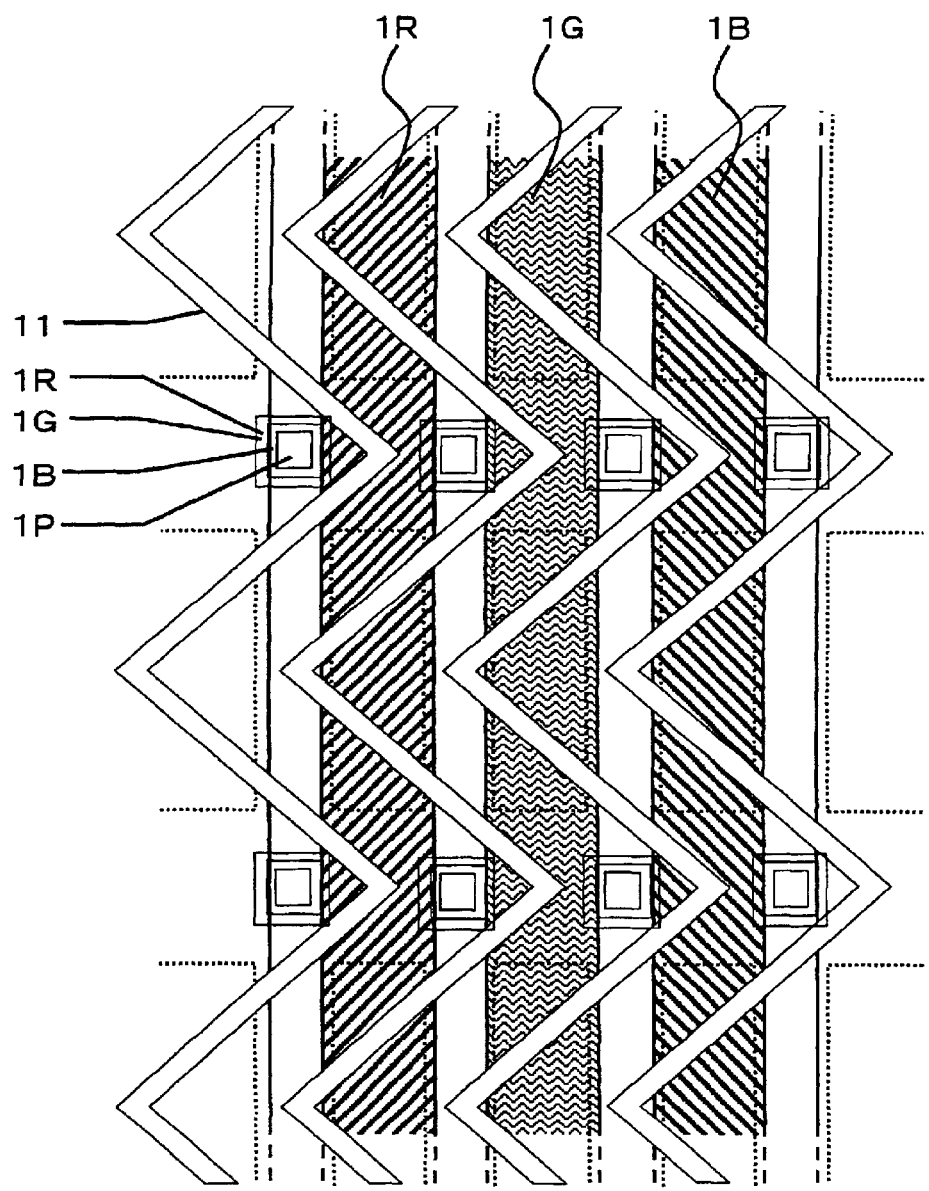
FIG. 2 is a schematic plan view showing an example of the color filter substrate having protrusions for controlling liquid crystal alignment and spacers prepared in Example 1.

FIG. 2 is a plan view showing an example of the color filter of this invention. On a black matrix 19 and pixels (1R, 1G and 1B), ITO transparent electrodes are formed, and to divide the pixels, polygonal line protrusions 11 trapezoidal in section are formed. Also on the opposite electrode substrate, protrusions are formed to be arranged alternately with the protrusions on the color filter.

The color filter of this invention and the liquid crystal display device using it can be used as display screens of personal computers, word processors, engineering work stations, navigation systems, liquid crystal television sets, etc., and can also be suitably used for liquid crystal projection, etc. They can also be suitably used as space modulation devices using liquid crystal in the areas of optical communication and optical information processing. A space modulation device modulates the light incident on the device in intensity, phase, polarization direction, etc. in response to a signal applied to the device, and is used for real time holography, space filter, inherent/coherent conversion, etc.

EXAMPLES

This invention is described below particularly based on examples, though not limited thereto or thereby
(Preparation of a Polyimide Precursor)

144.1 g of 3,3',4,4'-bisphenyltetracarboxylic dianhydride was mixed with 1095 g of γ-butyrolactone and 209 g of N-methyl-2-pyrrolidone, and 95.1 g of 4,4'-diaminodiphenyl ether and 6.2 g of bis(3-aminopropyl)tetramethyldisiloxane were added. Reaction was effected at 70° C. for 3 hours, and 2.96 g of phthalic anhydride was added. Reaction was effected further at 70° C. for 1 hour, to obtain a polyimide precursor (polyamic acid) solution.
(Volume Resistance Measuring Method)

A glass substrate with a thin aluminum film formed by vapor deposition was coated with a material sample with a thickness of 2 μm. On the coating film, furthermore aluminum electrodes with a diameter of 15 mm were formed by vapor deposition. Between the two electrodes on both sides of the coating film, a DC 1 V was applied, and from the current value at 5 minutes after applying the voltage and the thickness of the coating film, the volume resistance was obtained.

Example 1
(Preparation of Resin Black Matrix)

A carbon black mill base composed as listed below was dispersed using a homogenizer at 7000 rpm for 30 minutes, and filtered to remove the glass beads, thus preparing a black paste.

| Carbon blackmill base | 4.6 parts |
|---|---|
| Carbon black (MA100 produced by Mitsubishi Chemical Corp.) | |
| Polyimide precursor solution | 24.0 parts |
| N-methyl-2-pyrrolidone | 61.4 parts |
| Glass beads | 90.0 parts |

A non-alkaline glass substrate was coated with a black paste using a spinner and semi-cured in an oven at 135° C. for 20 minutes. In succession, a positive photoresist ("Microposit" SRC100 30 cp produced by Shipley) was applied using a spinner and dried at 80° C. for 20 minutes. The thickness of the photoresist film was 1.5 μm. The photoresist was exposed through a photo mask.

Then, the substrate was dipped in a 23° C. aqueous solution containing 2 wt % of tetramethylammonium hydroxide used as a developer, and simultaneously oscillated to make one reciprocation every 5 seconds in a width of 10 cm, to develop the positive photoresist and to etch the polyimide precursor simultaneously. The development time was 60 seconds. Then, the positive photoresist was removed using methyl cellosolve acetate, and the substrate was further cured at 300° C., for 30 minutes. Thus, a 0.9 μm thick lattice resin black matrix with a long-bar segment width of 20 μm and a short-bar segment width of 30 μm was formed in the black matrix regions (2, 3, 4, 5, 6, 7, 8, 9 and 10) of FIG. 1. The OD value of the resin black matrix was 3.0.
(Formation of Respective Color Layers)

As red, green and blue pigments, dianthraquinone pigment of Color Index No. 65300 Pigment Red 177, phthalocyanine green pigment of Color Index No. 74265 Pigment Green 36 and phthalocyanine blue pigment of Color Index No. 74160 Pigment Blue 15:4 were pre-arranged respectively. Six parts by weight of the polyimide precursor solution used for the black matrix and 4 parts by weight of any of said pigments were mixed and dispersed to obtain three color pastes of red, green and blue. At first, the resin black matrix substrate was coated with the red paste which was semi-cured at 120° C. for 20 minutes. Then, a positive photoresist ("Microposit"0 SRC100 30 cp produced by Shipley) was applied using a spinner and dried at 80° C. for 20 minutes. It was exposed using a photo mask, and the substrate was oscillated in 2 wt % tetramethylammonium hydroxide aqueous solution, to develop the positive photoresist and to etch the polyimide precursor simultaneously. Then, the positive phtoresist was removed using methyl cellosolve acetate, to form a red color layer pattern in stripes in the long bar-segment direction, and it was cured at 300° C. for 30 minutes. The thickness of the red color layer was 1.4 µm. Thus, in the 1R regions of FIG. 2, red pixels were formed.

The substrate was washed with water, and green and blue color layer patterns of stripes were formed with the respective spaces between the three colors kept at 14µ and with some portions of the color layers overlaid on the black matrix, to form green pixels and blue pixels in the 1G and 1B regions of FIG. 2. The thickness of the respective films was 1.4 µm.

When the respective color layer patterns were formed, spacers were formed simultaneously by laminating respective color layers as dots at the centers of the bar intersections of the resin black matrix lattice (positions indicated by 5, 7 and 9 in FIG. 1). At first, dots of a red color layer were formed using a photo mask pattern of 20 µm square. Then, using a photo mask of the same size, dots of a green color layer were formed and laminated on the red color layer. On the green color layer, using a photo mask pattern of 15 µm squares, dots of a blue color layer were formed and laminated.

Then, a 150 nm thick ITO film with a surface resistance of 20Ω/□ was formed by sputtering.

Furthermore, the polyimide precursor solution was applied and semi-cured at 135° C. for 20 minutes. Then, a positive photoresist was applied and dried at 80° C. for 20 minutes. Through a photo mask, it was exposed and the substrate was dipped in 2 wt % tetramethylammonium hydroxide aqueous solution, to develop the photoresist and to etch the polyimide precursor simultaneously, and the photoresist was removed using methyl cellosolve. Then, curing was effected at 250° C. for 30 minutes, to form a triangular wave-formed protrusion for controlling liquid crystal alignment (11) shown in FIG. 2. At this time, a photo mask pattern of 10 µm squares was used to laminate a polyimide layer as the topmost layer 1P of the dots simultaneously. The sectional form of the protrusion for controlling liquid crystal alignment was a trapezoid with a bottom side length of 12 µm, a top side length of 10 µm and a thickness of 1.5 µm. Thus, a color filter was obtained.

The volume resistance of the transparent polyimide layer forming the protrusion for controlling liquid crystal alignment was $10^{13}$ Ωcm. The bottom area of the topmost layer of each spacer was 100 µm².

Because of paste properties, the thickness obtained by subtracting the thickness of any color layer in a display region from the total of the thickness of the laminated respective color layers and the thickness of the resin BM film, and the height of a spacer from the surface of the ITO layer in a light transmitting region formed on one color layer to the top of the spacer are respectively different from color to color. Due to the misalignment of the laminated spacer layer or the lack of the top layer, the spacer height varied rather greatly in the substrate plane, and some samples were partially insufficient in height without conforming to an intended height of 3.9±0.1 µm.

Also on the frame formed by the resin black matrix at the periphery of the screen, spacers were formed by overlaying color layers. In this case, the area of the topmost layer of each spacer was made double that of each spacer in the screen, and the number of spacers per unit area was half that of the spacers in the screen, to make the area of the spacers in contact with the opposite substrate per unit area equal to that in the screen. Furthermore, also on the substrate outside the peripheral frame, the pattern of the resin layer used for preparing the resin matrix and the pattern of the resin layer used for preparing the color films were laminated as in the screen, to form spacers simultaneously with the preparation of the spacers in the color filter and the screen. In this case, the spacers were formed to ensure that the contact area between the spacers and the opposite substrate per unit area become equal to that in the screen.

(Preparation of Electrode Substrate)

On a non-alkaline glass substrate, a thin chromium film was formed by sputtering, and gate electrodes were patterned by photolithography. Then, a 700 nm thick silicon nitride film as an insulation layer, a 100 nm thick amorphous silicon film as a channel layer, and a 500 nm thick silicon nitride film as an etching stopper layer were continuously formed by plasma CVD. Subsequently, the silicon nitride film formed as an etching stopper layer was patterned by photolithography. An n+ amorphous silicon film for ohmic contact between TFT terminals and metal electrodes was formed and patterned. At this time, the amorphous silicon film formed as a channel layer was also patterned simultaneously. On it, an ITO film destined to be display electrodes was formed and patterned. Furthermore, aluminum as a wiring material was attached as a film by sputtering, and signal wires and TFT metal electrodes were prepared by photolithography. With drain electrodes and source electrodes as masks, the n+ amorphous silicon film of the channel region was removed by etching, to obtain an electrode substrate with TFT elements.

(Preparation and Evaluation of Color Liquid Crystal Display Device)

On the color filter of this invention, a vertical alignment layer was formed. Similarly, also on the opposite electrode substrate with thin film transistors, a vertical alignment layer was formed. Also on the opposite electrode substrate, protrusions similar to the doglegged protrusions on the color filter were arranged, though shifted by a half pixel pitch to ensure that the protrusions on the counter electrode substrate could be disposed between the adjacent protrusions on the color filter when the counter electrode substrate and the color filter were joined together. Using an epoxy adhesive as a sealant, the two substrates were stuck to each other, and from injection ports formed in the sealed portion, the liquid crystal to be vertically aligned was filled. After completion of filling liquid crystal, the injection ports were sealed, and a polarizing plate was stuck to the outside of the substrate, to prepare a liquid crystal display device.

The liquid crystal filling time was short and the obtained liquid crystal display device was good in the alignment of liquid crystal and did not cause light leak from spacers since no spacers were provided in the light transmitting regions. Furthermore, there was no short circuit portion due to a spacer between the transparent conductive layer on the color filter and the electrode substrate. Some samples, in which the spacer height was partially insufficient in the substrate plane, were uneven in picture quality.

Example 2

A color filter was produced as described in Example 1, except that a transparent protective layer was formed on the color layers and that the thickness of the protrusion for controlling liquid crystal alignment was 2 μm. The transparent protective layer was formed as described below.

Four point zero eight grams of methyltrimethoxysilane, 9.9 g of phenyltrimethoxysilane and 28.8 g of γ-aminopropylmethyldiethoxysilane were dissolved into 156.3 g of γ-butyrolactone and 150 g of 3-methyl-3-methoxybutanol, and with stirring at 30° C., 9.12 g of distilled water was added. The mixture was heated and stirred at 50° C. for 2 hours, to be hydrolyzed and condensed. Then, the mixture was heated to 130° C. for further condensation, while the produced alcohol and water were distilled away. The solution was cooled to 50° C., and with stirring, 24.17 g of 3,3',4,4'-benzophenonetetracarboxylic dianhydride was added, to obtain an amic acid polyorganosiloxane solution.

Two hundred and seventy two grams of methyltrimethoxysilane and 396 g of phenyltrimethoxysilane were dissolved into 785.6 g of 3-methyl-3-methoxybutanol, and with stirring, a mixture consisting of 3.34 g of phosphoric acid and 216 g of distilled water was added. The obtained solution was heated to 105° C., for 1 hour, to distill away 302 g of a component mainly composed of methanol. Then, the residue was heated at 130° C. for 2 hours, to distill away 147 g of a component mainly composed of alcohol and water. The residue was cooled to room temperature, and 86 g of 3-methyl-3-methoxybutanol was added, to obtain a polyorganosiloxane solution.

Three hundreds and eighty three grams of tetrabutoxyzirconium was added to a mixture consisting of 650 g of ethyl acetoacetate and 1567 g of 3-methyl-3-methoxybutanol, and the mixture was stirred at 30° C. for 1 hour and allowed to stand for 24 hours, to obtain a zirconia chelate solution.

Seven point five grams of the amic acid polyorganosiloxane solution, 10 g of the polyorganosiloxane solution and 1.5 g of the chelate solution were mixed, to obtain a transparent resin composition. A substrate with a black matrix and three primary color layers formed on it was coated with said transparent resin which was dried at 80° C., for 10 minutes and cured at 280° C. for 60 minutes, to form a 0.4 μm thick transparent protective layer.

Because of paste properties, the thickness obtained by subtracting the thickness of any color layer in a display region from the total of the thickness of the laminated respective color layers and the thickness of the resin BM film, and the height of a spacer from the surface of the ITO layer in a light transmitting region formed on one color layer to the top of the spacer are respectively different from color to color. Furthermore, the spacer height could be adjusted by adjusting the transparent protective film highly capable of being flattened. Due to the misalignment of the laminated spacer layer or the lack of the top layer, the spacer height varied rather greatly in the substrate plane, and some samples were partially insufficient in height without conforming to an intended height of 3.9±0.1 μm.

The liquid crystal display device was prepared as described in Example 1. The liquid crystal filling time was short and the liquid crystal display device obtained was good in the alignment of liquid crystal and since there were no spacers in the light transmitting regions, the light leak due to spacers did not occur. Furthermore, there was no short-circuit portion due to a spacer between the transparent conductive layer on the color filter and the opposite electrode substrate. However, some samples, in which the spacer height was partially insufficient in the substrate plane, were uneven in picture quality.

Example 3

A color filter was prepared as described for Example 2, except that the protrusion for controlling liquid crystal alignment was prepared by using the red paste used in Example 1.

The red paste was applied onto the transparent conductive film and semi-cured at 120° C. for 20 minutes. Then, a positive photoresist was applied and dried at 80° C. for 20 minutes. It was exposed through a photo mask and dipped in 2 wt % tetramethylammonium hydroxide aqueous solution, to develop the photoresist and to etch the polyimide precursor simultaneously, and the photoresist was removed by using methyl cellosolve. The red paste film was cured at 300° C. for 30 minutes, to form a triangular wave-formed protrusion for controlling liquid crystal alignment (11) shown in FIG. 2. At this time, a photo mask pattern of 10 μm squares was used to laminate a red color layer as the topmost layer of said dot pattern. The sectional form of the protrusion for controlling liquid crystal alignment was a trapezoid with a bottom side length of 12μ, a top side length of 10μ and a thickness of 2 μm. Thus, a color filter was obtained.

The volume resistance of the red color layer forming the protrusion for controlling liquid crystal alignment was $10^{12}$ Ωcm. The bottom area of the topmost layer of each spacer was 100 μm².

Due to the misalignment of the laminated spacer layer or the lack of the top layer, the spacer height varied rather greatly in the substrate plane. Some samples were partially insufficient in spacer height without conforming to an intended height of 3.9±0.1 μm.

The liquid crystal display device was prepared as described in Example 1. The liquid crystal filling time was short and the liquid crystal display device obtained was good in the alignment of liquid crystal and, since there were no spacers in the light transmitting regions, the light leak due to spacers did not occur. Furthermore, there was no short-circuit portion due to a spacer between the transparent conductive layer on the color filter and the opposite electrode substrate. However, some samples, in which the spacer height was partially insufficient in the substrate plane, were uneven in picture quality.

Example 4

The three color pastes of red, green and blue prepared as described in Example 1 were used to form a color-overlaid black matrix.

A transparent non-alkaline glass substrate was coated with the red paste which was semi-cured at 120° C., for 20 minutes. Then, a positive photoresist ("Microposit" RC100 30 cp produced by Shipley) was applied using a spinner and dried at 80° C. for 20 minutes. It was exposed using a photo mask, and the substrate was dipped and oscillated in 2 wt % tetramethylamnmonium hydroxide aqueous solution, to develop the positive photoresist and to etch the polyimide precursor simultaneously. Then, the positive photoresist was removed using methyl cellosolve acetate and the red paste film was cured at 300° C. for 30 minutes.

The thickness of the red color layer was 1.5 μm. The red color layer pattern was formed at the positions of the red pixel regions (1R) and of the color-overlaid black matrix forming regions (2, 3, 5, 6, 7, 8 and 9) of FIG. 1.

The substrate was washed with water, and similarly, a green color layer was formed on the positions of the green pixel regions (1G) and of the color-overlaid black matrix forming regions (3, 4, 5, 7, 8, 9 and 10) of FIG. 1. The thickness of the green color layer was 1.5 μm in the pixel regions.

Furthermore, the substrate was washed with water, and similarly, a blue color layer was formed on the positions of the blue pixel regions (1B) and of the color-overlaid black matrix forming regions (2, 4, 5, 6, 7, 9 and 10) of FIG. 1. The thickness of the blue color layer was 1.5 μm in the pixel regions.

As a result of the above process, red pixels (1R), green pixels (1G), blue pixels (1B), red and blue two-color-overlaid black matrix regions (2 and 6), red and green two-color-overlaid black matrix regions (3 and 8), green and blue two-color-overlaid black matrix regions (4 and 10), and red, blue and green three-color-overlaid black matrix regions corresponding to the bar intersections of the black matrix lattice (5, 7 and 9) were formed. The width of the long-bar segments was 20 μm and the width of the short-bar segments was 30 μm. The size of rectangular bar intersections 5, 7 and 9 in FIG. 1 was 20 μm (short side)×30 μm (long side).

On them, ITO film transparent electrodes with a thickness of 150 nm and a surface resistance of 20 Ω/□ were formed.

Figure 3:
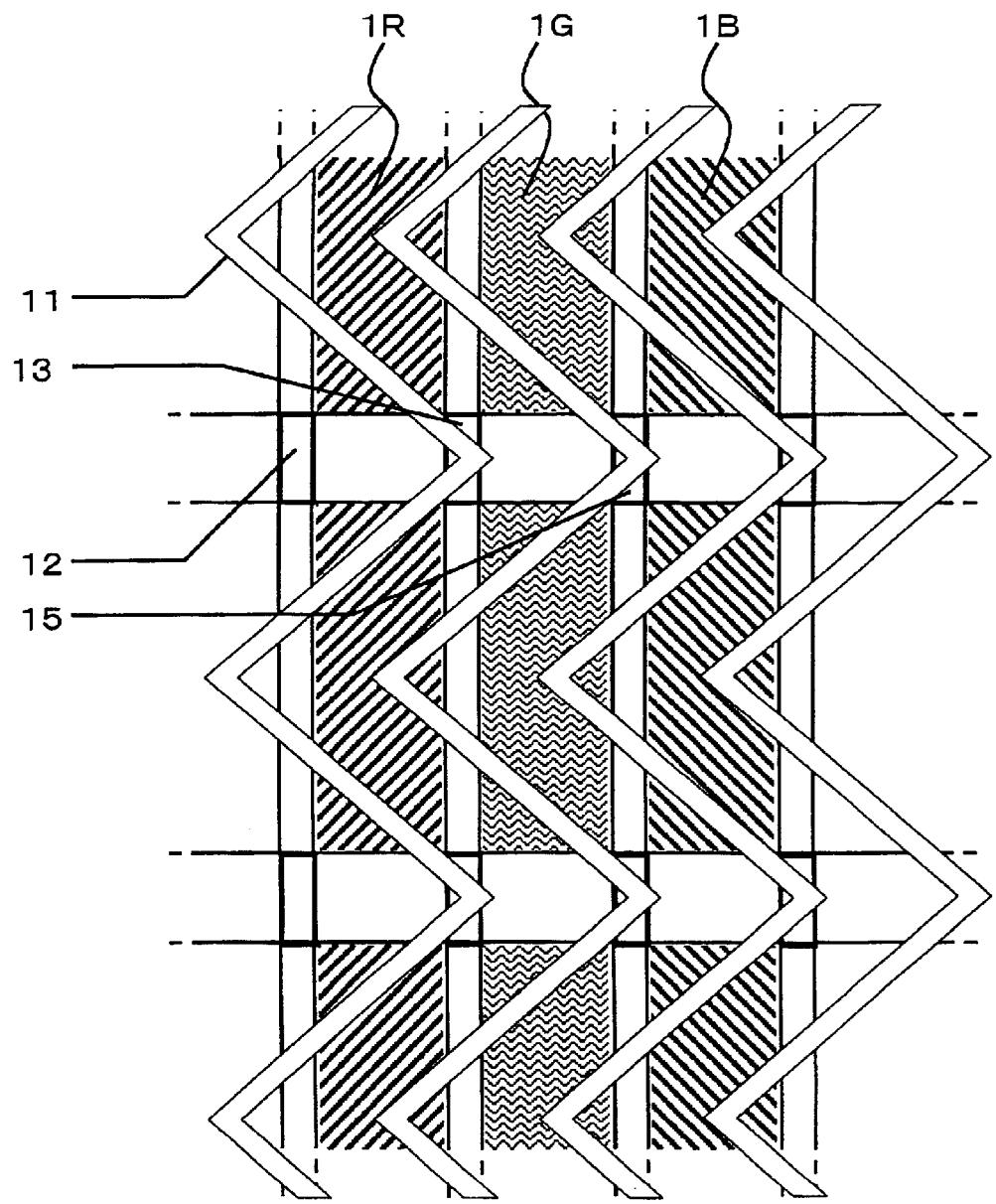
FIG. 3 is a schematic plan view showing an example of the color filter substrate having protrusions for controlling liquid crystal alignment and spacers of this invention.

Furthermore, a polyimide precursor solution was applied and semi-cured at 135° C. for 20 minutes. Then, a positive photoresist was applied and dried at 80° C. for 20 minutes. It was exposed through a photo mask, and dipped in 2 wt % tetramethylammonium hydroxide aqueous solution, to develop the photoresist and to etch the polyimide precursor simultaneously, and the photoresist was removed using methyl cellosolve. The polyimide precursor was cured at 250° C. for 30 minutes, to form a triangular wave-formed protrusion for controlling liquid crystal alignment (11) shown in FIG. 3.

The sectional form of the protrusions for controlling liquid crystal alignment on the pixels was a trapezoid with a bottom side length of 12 μm, a top side length of 8 μm and a thickness of 2.0 μm. The protrusions, on the three-color-overlaid black matrix regions indicated by 12, 13 and 14 of FIG. 3 acted as spacers. That is, one spacer was formed for each pixel. The area of the spacer bottom was about 200 μm² per pixel. Furthermore, with all the samples, the spacer height was good, being in conformity with an intended height of 3.9±0.1 μm.

The liquid crystal display device was prepared as described in Example 1. The liquid crystal filling time was short and the liquid crystal display device obtained was good in the alignment of liquid crystal and uniform in picture quality. Since there were no spacers in the light transmitting regions, the light leak due to spacers did not occur. Furthermore, there was no short-circuit portion due to a spacer between the transparent conductive layer on the color filter and the opposite electrode substrate.

Example 5

Figure 4:
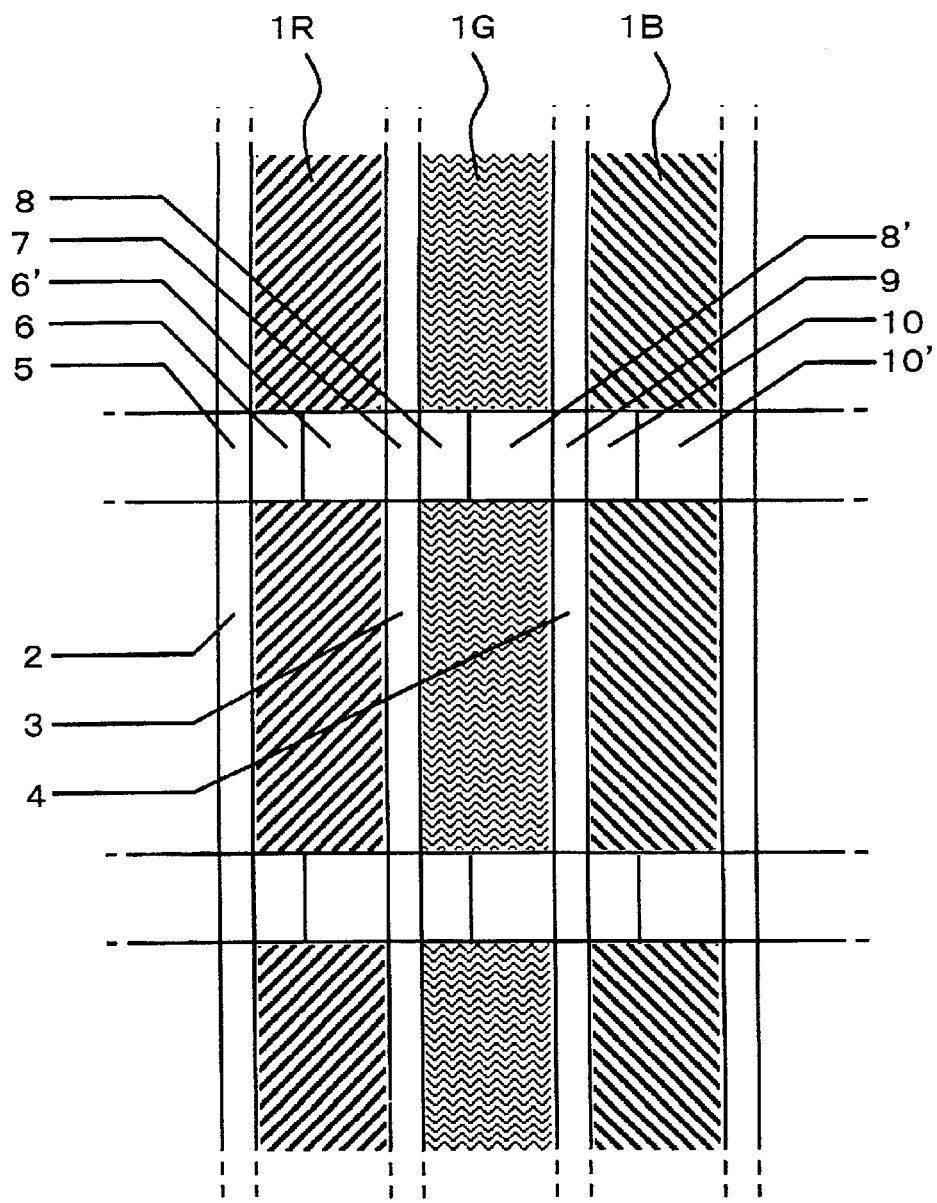
FIG. 4 is a schematic plan view showing an example of the coating pattern of color layers in this invention.

As described for Example 4, red, green and blue color layers were formed. However, the red color layer was formed on the positions of the red pixel regions (1R) and of the color-overlaid black matrix forming regions (2, 3, 5, 6, 6', 7, 8, 8', 9, 10 and 10') of FIG. 4. The green color layer was formed on the positions of the green pixel regions (1G) and of the color-overlaid black matrix forming regions (3, 4, 5, 6, 7, 8, 9 and 10) of FIG. 4. Furthermore, the blue color layer was formed on the positions of the blue pixel regions (1B) and of the color-overlaid black matrix forming regions (2, 4, 5, 6, 6', 7, 8, 8', 9, 10 and 10') of FIG. 4.

As a result of the above process, red pixels (1R), green pixels (1G), blue pixels (1B), red and blue two-color-overlaid black matrix regions (2, 6', 8' and 10'), red and green two-color-overlaid black matrix regions (3), green and blue two-color-overlaid black matrix regions (4) and red, blue and green three-color-overlaid black matrix regions (5, 6, 7, 8, 9 and 10, long bar-segment width of each pair of continuous regions 30 μm, and short bar-segment width 40 μm) were formed. The long bar-segment width of the black matrix was 20 μm and the short bar-segment width was 30 μm, as in Example 4.

Figure 5:
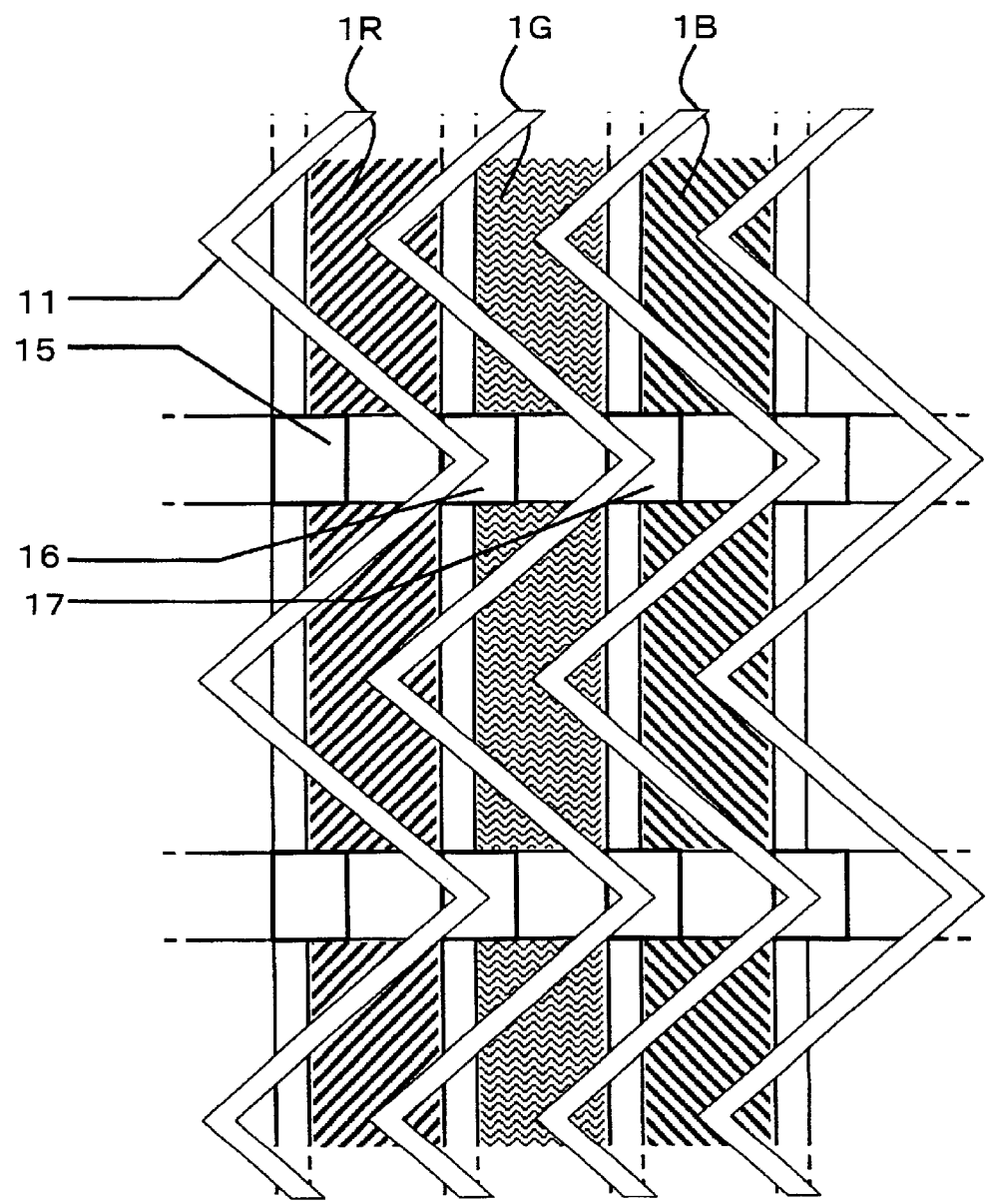
FIG. 5 is a schematic plan view showing an example of the color filter substrate having protrusions for controlling liquid crystal alignment and spacers of this invention.

As described for Example 1, on them, ITO film transparent electrodes and the triangular wave-formed protrusion for controlling liquid crystal alignment (11) shown in FIG. 5 were formed.

The sectional form of the protrusions for controlling liquid crystal alignment on the pixels was a trapezoid with a bottom side length of 12 μm, a top side length of 8 μm and a thickness of 2.0 μm. The protrusions on the three-color-overlaid black matrix regions indicated by 15, 16 and 17 of FIG. 5 acted as spacers. That is, one spacer was formed for each pixel. The areas of the spacer top and bottom were about 220 μm² per pixel. The spacer height conformed to an intended height of 3.9±0.1 μm. Thus, a color filter of this invention was obtained.

As described for Example 1, a liquid crystal display device was prepared. The liquid crystal filling capability was good. The liquid crystal display device was good in the alignment of liquid crystal, and free from cell gap irregularity, being good in picture quality. Furthermore, since there were no spacers in the light transmitting regions, no light leak due to spacers occurred. Moreover, there was no short-circuit portion due to a spacer between the transparent conductive layer on the color filter and the opposite electrode substrate.

Example 6

Figure 6:
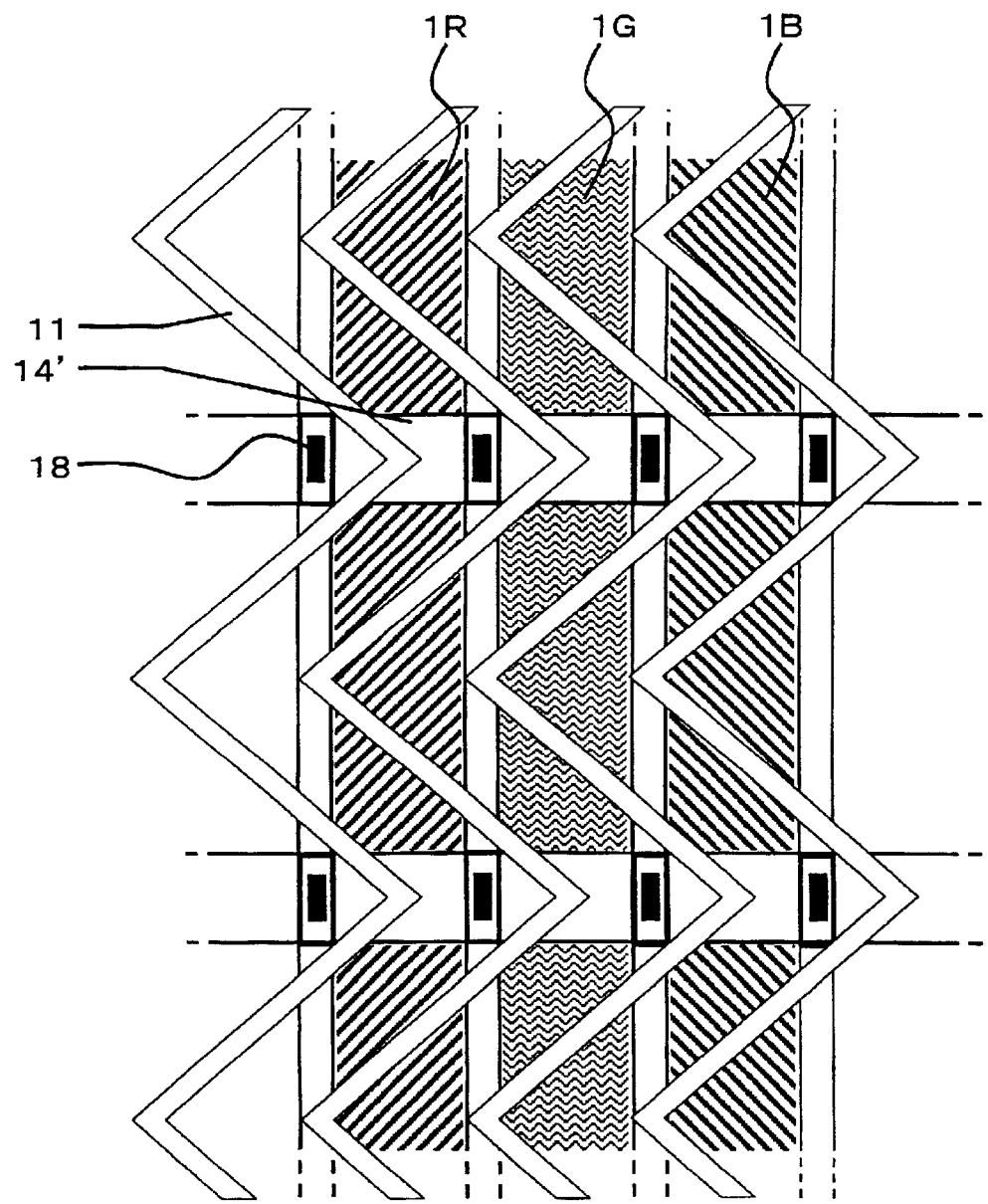
FIG. 6 is a schematic plan view showing an example of the color filter substrate having protrusions for controlling liquid crystal alignment and spacers of this invention.

As described for Example 4, red, green and blue layers were formed. The long bar-segment width of the black matrix was 20 μm and the short bar-segment width was 30 μm. Then, as described for Example 1, on them, ITO film transparent electrodes were formed, and the triangular wave-formed protrusion for controlling liquid crystal alignment (11) shown in FIG. 6 was formed. Using the same material, dots (18) were formed at the centers of the three-color-overlaid black matrix regions (positions indicated by 12, 13 and 14 of FIG. 3).

The sectional form of the protrusions for controlling liquid crystal alignment on the pixels was a trapezoid with a bottom side length of 12 μm, a top side length of 8 μm and a thickness of 2.0 μm. Each of the dots had a form of 12 μm (short bar-segment direction)×18 μm (long bar-segment direction) at the bottom and 8 μm (short bar-segment direction)×14 μm (long bar-segment direction) at the top, and the bottom area of the topmost layer of each spacer was about 216 μm². The dots acted as spacers. That is, one spacer was formed per pixel. The area of the spacer bottom was about 110 μm². The spacer height conformed to an intended height of 3.9±0.1 μm. Thus, a color filter of this invention was obtained.

As described for Example 1, a liquid crystal display device was prepared. The liquid crystal filling capability was excellent, and the liquid crystal could be filled into the cells in a short time. The liquid crystal display device was good in the alignment of liquid crystal, and free from cell gap irregularity, being good in picture quality. Furthermore, since there were no spacers in the light transmitting regions, no light leak due to spacers occurred, and the there was no short-circuit portion due to a spacer between the transparent conductive layer on the color filter and the opposite electrode substrate.

Example 7

As described for Example 4, red, green and blue color layers were formed. However, the red color layer was formed on the positions of the red pixel regions (1R) and of the color-overlaid black matrix forming regions (2, 3, 4, 5, 6, 7, 8, 9 and 10) of FIG. 1. The green color layer was formed on the positions of the green pixel regions (1G) and of the color-overlaid black matrix forming regions (2, 3, 4, 5, 6, 7, 8, 9 and 10) of FIG. 1. Furthermore, the blue color layer was formed on the positions of the blue pixel regions (1B) and of the color-overlaid black matrix forming regions (2, 3, 4, 5, 6, 7, 8, 9 and 10) of FIG. 1.

As a result of the above process, red pixels (1R), green pixels (1G), blue pixels (1B) and red, blue and green three-color-overlaid black matrix regions (2, 3, 4, 5, 6, 7, 8, 9 and 10) were formed. The long bar-segment width of the black matrix were 20 μm and the short bar-segment width was 30 μm.

Figure 7:
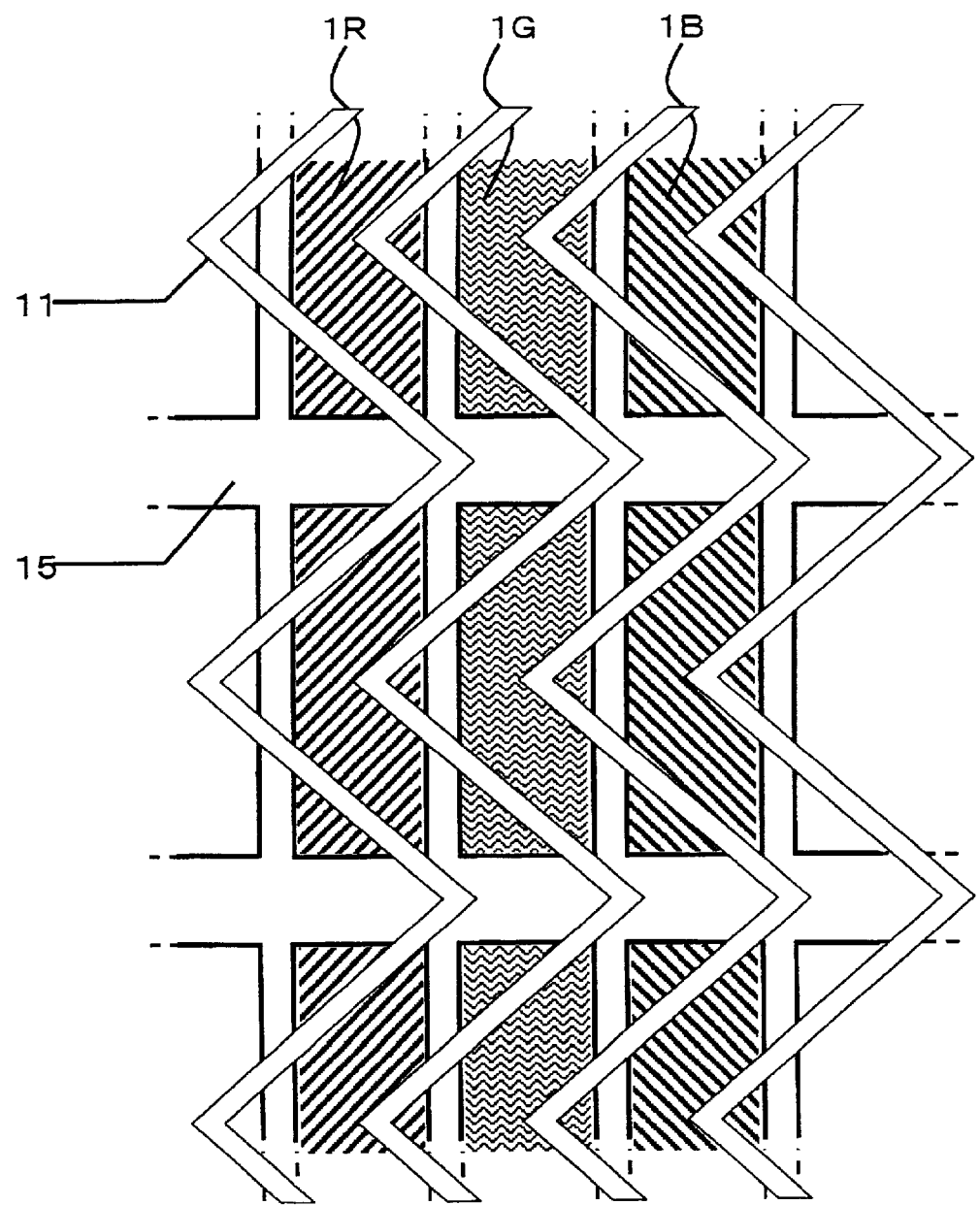
FIG. 7 is a schematic plan view showing an example of the color filter substrate having protrusions for controlling liquid crystal alignment and spacers of this invention.

As described for Example 1, on them, ITO film transparent electrodes were formed, and the triangular wave-formed protrusion for controlling liquid crystal alignment (11) shown in FIG. 7 was formed.

The sectional form of the protrusions for controlling liquid crystal alignment on the pixels was a trapezoid with a bottom side length of 12 μm, a top side length of 8 μm and a thickness of 2.0 μm. The protrusions on the three-color-overlaid black matrix regions (positions indicated by 5, 7 and 9 in FIG. 1) acted as spacers. That is, one spacer was formed per pixel. The bottom area of each spacer was about 230 μm². Furthermore, the protrusions on the three-color-overlaid black matrix regions (positions indicated by 2, 3 and 4 in FIG. 1) also acted as spacers. That is, two spacers were formed per pixel, and the bottom area of each spacer was about 160 μm². Thus, total three spacers were formed per pixel, and the total bottom area of spacers per pixel was about 550 μm². The spacer height conformed to an intended height of 3.9±0.1 μm. Thus, a color filter of this invention was obtained.

As described for Example 1, a liquid crystal display device was prepared. The liquid crystal filling speed was lower than that in Example 4. The liquid crystal display device was good in the alignment of liquid crystal and was free from cell gap irregularity, being good in picture quality. Furthermore, since there were no spacers in the light transmitting regions, no light leak due to spacers occurred. Moreover, there was no short-circuit portion due to a spacer between the transparent conductive layer on the color filter and the opposite electrode substrate.

Example 8

Figure 8:
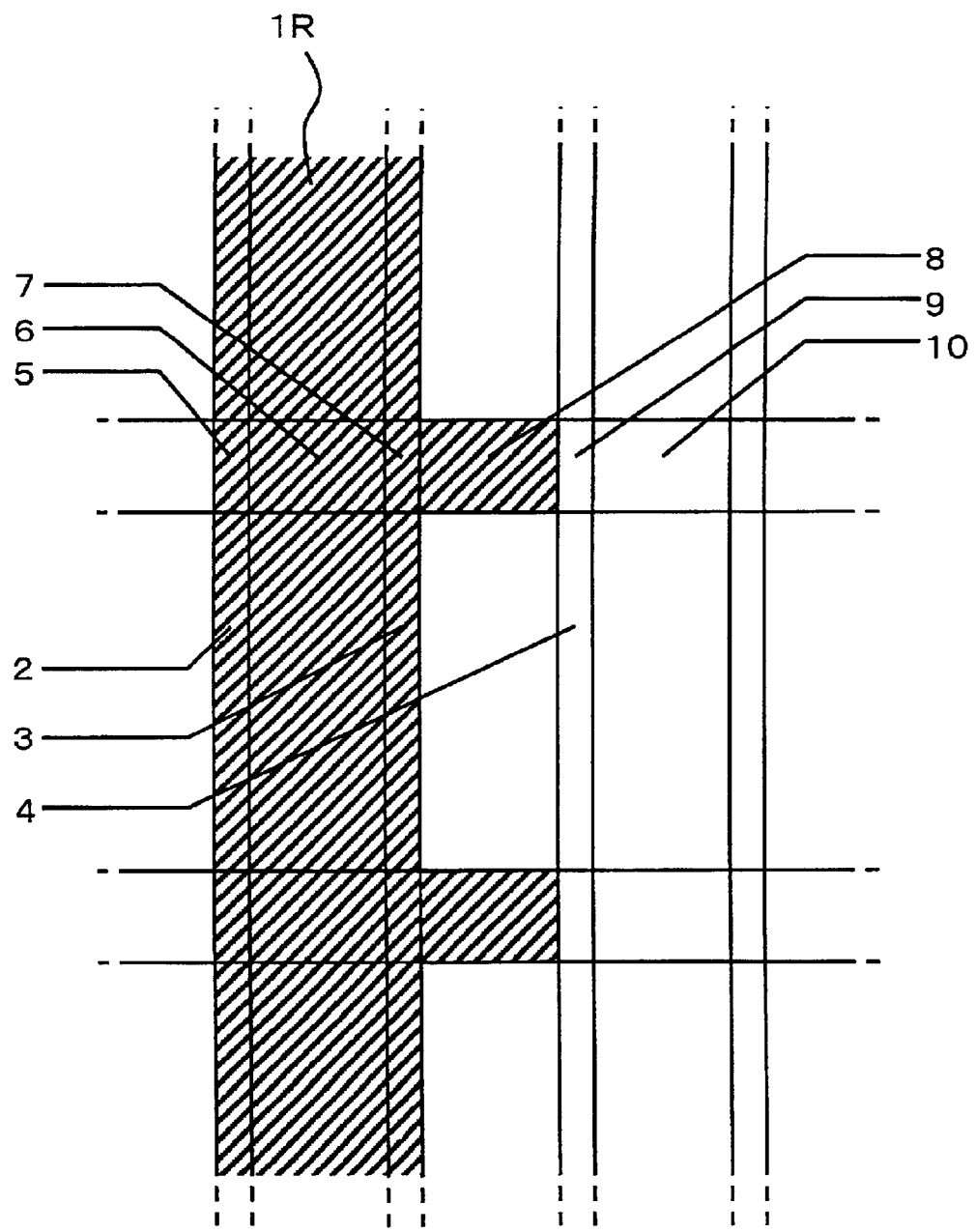
FIG. 8 is a schematic plan view showing an example of the coating pattern of color layers in this invention.
Figure 9:
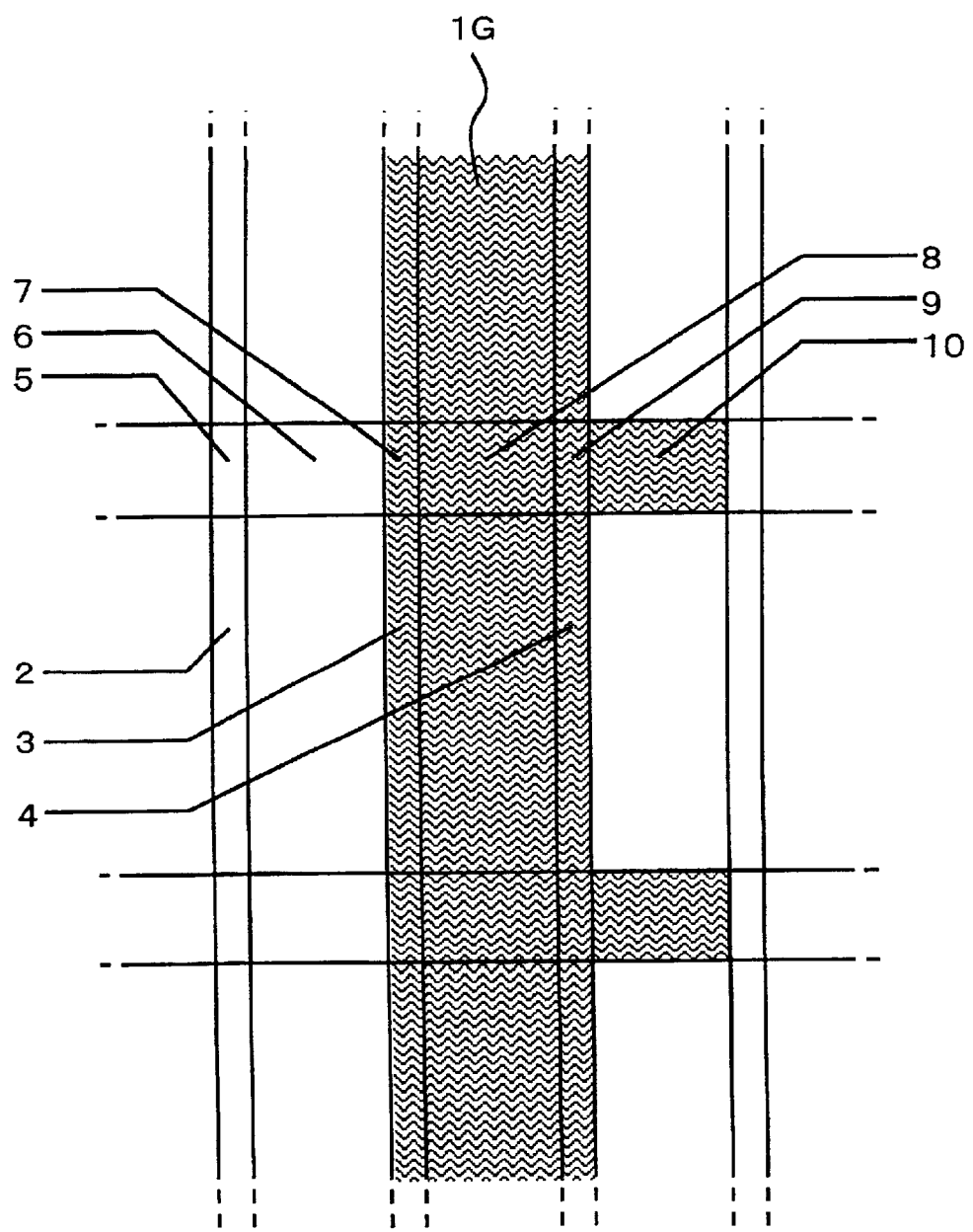
FIG. 9 is a schematic plan view showing an example of the coating pattern of color layers in this invention.
Figure 10:
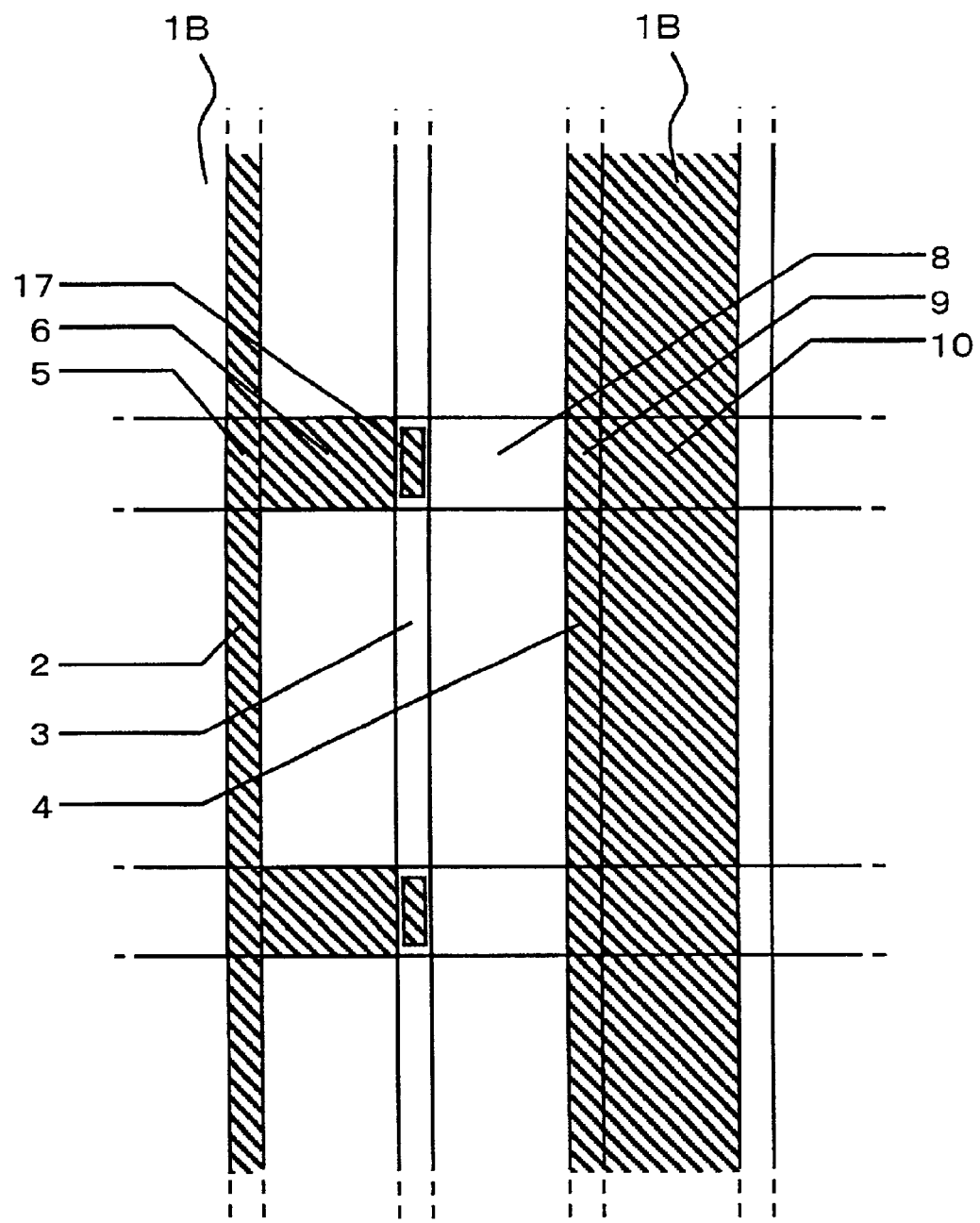
FIG. 10 is a schematic plan view showing an example of the coating pattern of color layers in this invention.
Figure 11:
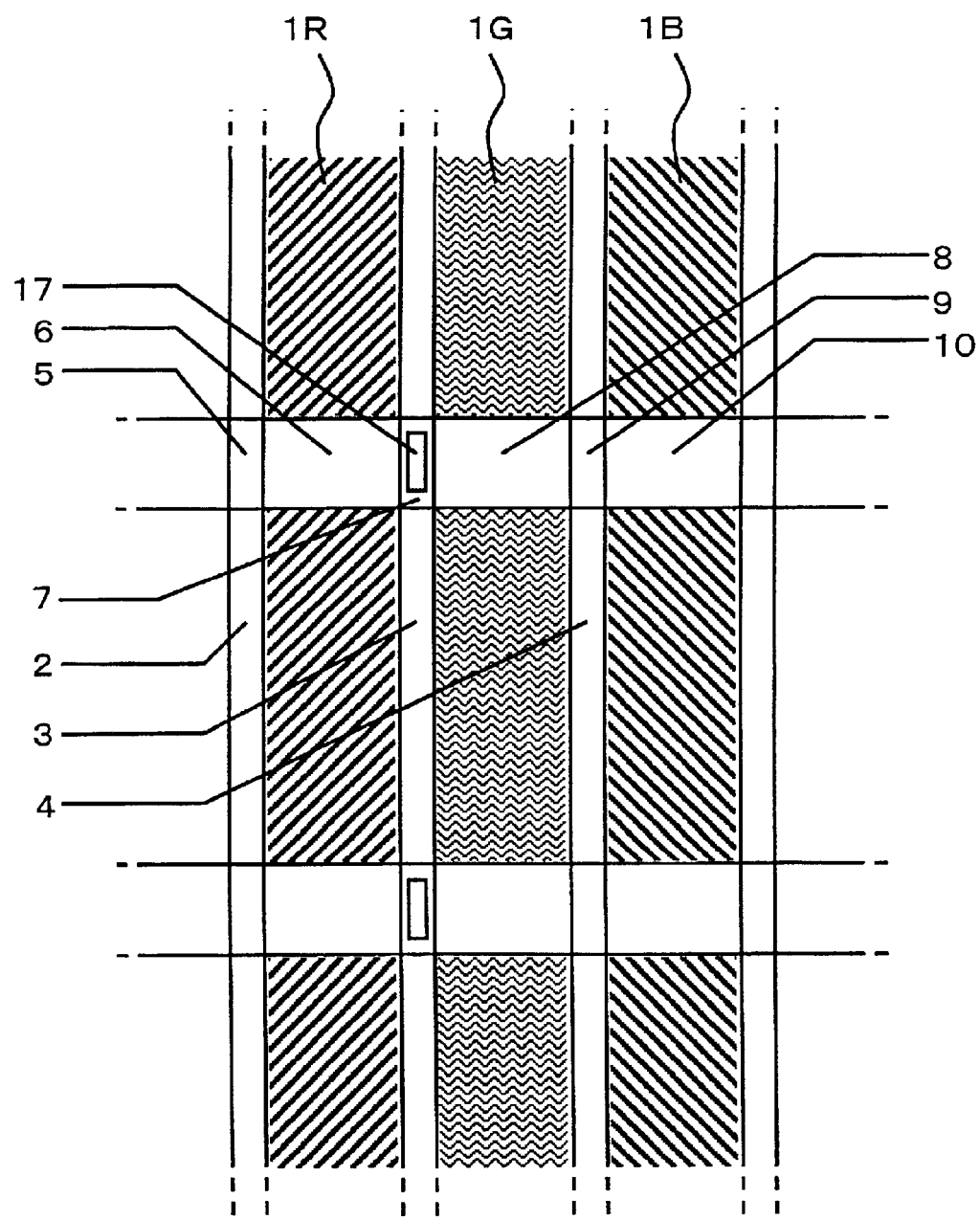
FIG. 11 is a schematic plan view showing an example of the coating pattern of color layers in this invention.
Figure 12:
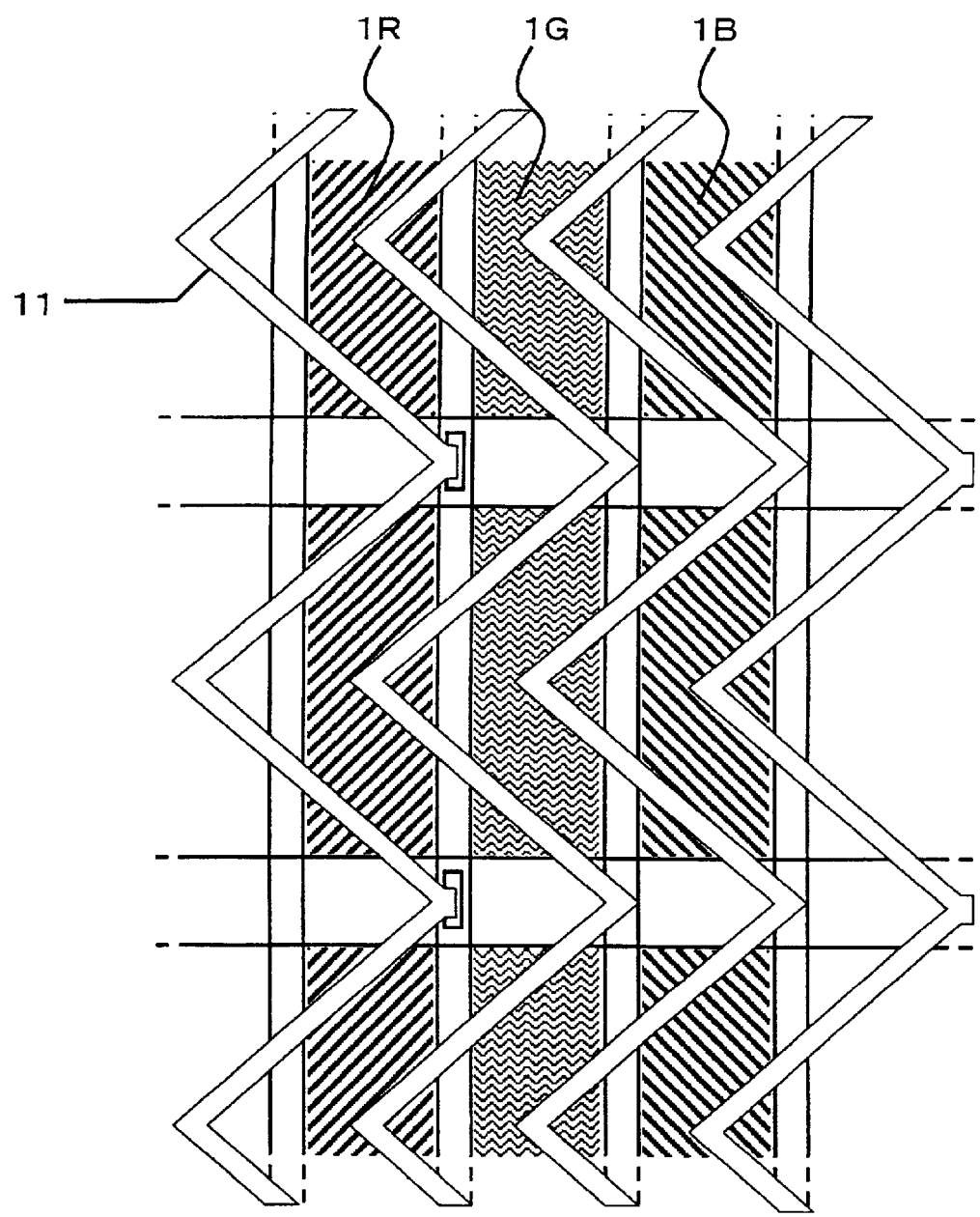
FIG. 12 is a schematic plan view showing an example of the color filter substrate having protrusions for controlling liquid crystal alignment and spacers of this invention.

As described for Example 4, a red color layer (1R and 2, 3, 5, 6, 7 and 8 of FIG. 8), a green color layer (1G and 3, 4, 7, 8, 9 and 10 of FIG. 9) and a blue color layer (1B and 2, 4, 5, 6, 17, 9 and 10 of FIG. 10) were formed. In FIG. 11, red pixels (1R), green pixels (1G), blue pixels (1B), red and blue two-color-overlaid black matrix regions (2 and 6), red and green two-color-overlaid black matrix regions (3 and 8), green and blue two-color-overlaid black matrix regions (4 and 10), and blue color layer dot spacers (20) on the two-color-overlaid black matrix at the bar intersections (5, 7 and 9) of black matrix lattice were formed. The size of each spacer acting as the base of the overlying spacer was 26 μm (long bar-segment direction)×16 μm (short bar-segment direction). As described for Example 1, ITO film transparent electrodes were formed, and the triangular wave-formed protrusion for controlling liquid crystal alignment (11) shown in FIG. 12 was formed using a positive resist.

At first, a positive photoresist ("Microposit" RC100 30 cp produced by Shipley) was applied using a spinner and dried at 80° C. for 20 minutes. It was exposed using a photo mask, and the substrate was dipped and oscillated in 2 wt % tetramethylammonium hydroxide aqueous solution, to develop the positive photoresist. It was then cured at 200° C. for 30 minutes. The sectional form of the protrusions for controlling liquid crystal alignment on the pixels was a semicylinder with a bottom length of 12 μm and a thickness of 1.5 μm. Furthermore, to use some portions of the triangular wave-formed protrusion for controlling liquid crystal alignment (11) as spacers, the divisionally aligning pattern was partially changed in design to be almost rectangular (the bottom in the section was 22 μm in the long bar-segment direction and 14 μm in short bar-segment direction). The area of the spacer bottom was about 310 μm² per pixel. The spacer height conformed to an intended height of 3.9±0.1 μm. Thus, a color filter of this invention was obtained.

As described for Example 1, a liquid crystal display device was prepared. The liquid crystal filling capability was good. The liquid crystal display device was good in the alignment of liquid crystal and free from cell gap irregularity, being good in picture quality. Furthermore, since there were no spacers in the light transmitting regions, no light leak due to spacers occurred. Moreover, there was no short-circuit portion due to a spacer between the transparent conductive layer on the color filter and the opposite electrode substrate.

Example 9

A color filter was prepared as described in Example 2, except that the protrusion for controlling liquid crystal alignment was prepared by using the black paste used in Example 1.

On the transparent conductive film, the black paste was applied and semi-cured at 135° C. for 20 minutes. Then, a positive photoresist was applied and dried at 80° C. for 20 minutes. It was exposed through a photo mask, and the substrate was dipped in 2 wt % tetramethylammonium hydroxide aqueous solution, to develop the photoresist and to etch the polyimide precursor simultaneously. The photoresist was removed using methyl cellosolve and the black paste film was cured at 300° C. for 30 minutes, to form the triangular wave-formed protrusion for controlling liquid crystal alignment (11) shown in FIG. 2. At this time, a photo mask pattern of 10 μm squares was used, to simultaneously laminate a black layer as the topmost layer of the dot pattern. The sectional form of the protrusion for controlling liquid crystal alignment was a trapezoid with a bottom side length of 12 μm, a top side length of 10 μm and a thickness of 2 μm.

Thus, a color filter as obtained.

The volume resistance of the black layer forming the protrusion for controlling liquid crystal alignment was $10^6$ Ωcm. The bottom area of the topmost layer of each spacer was 100 μm².

Because of paste properties, the thickness obtained by subtracting the thickness of any color layer in a display region from the total of the thickness of the laminated respective color layers and the thickness of the resin BM film, and the height of a spacer from the surface of the ITO layer in a light transmitting region formed on one color layer to the top of the spacer are respectively different from color to color. Due to the misalignment of the laminated spacer layer or lack of the topmost layer, the spacer height varied rather greatly in the substrate plane, and with some samples, the height was partially insufficient without conforming to an intended height of 3.9±0.1 μm.

The liquid display device was prepared as described in Example 1. The liquid crystal filling time was short and the liquid crystal display device was good in the alignment of liquid crystal, and since there were no spacers in the light transmitting regions, no light leak due to spacers occurred. However, since the outermost surfaces of the spacers were formed by a black layer with a volume resistance of $10^6$ Ωcm, surface defects caused by the electric conduction between the color filter and the electrodes of the opposite substrate occurred partly because of the misalignment of joined substrates, with some samples. Samples in which the spacer height was partially insufficient in the substrate plane were uneven in picture quality and were also long in the liquid crystal filling time.

Comparative Example 1

A liquid crystal display device was prepared as described for Example 2, except that no spacers were formed on the black matrix, and that polystyrene ball spacers with a diameter of 4.0 μm were sprayed on the color filter, before the color filter was joined with the electrode substrate.

The liquid crystal filling capability was good, and there was no short-circuit portion between the transparent conductive layer on the color filter and the opposite electrode substrate. However, since there were spacers in the pixel regions, light leak due to the spacers occurred, and when the color filter and the electrode substrate were joined, the polystyrene balls crushed the protrusions for controlling liquid crystal alignment, to disorder the alignment of liquid crystal and to cause cell gap irregularity in the vicinity, hence poor picture quality.

Example 10

A color filter was prepared as described for Example 2, except that the thickness of the three color layers was increased to 2.2 μm respectively and that when the protrusion for controlling liquid crystal alignment was formed, the polyimide layer was not arranged as the topmost layer of the spacers.

The color filter obtained like this was rather large in the dispersion of spacer height in the substrate plane due to misalignment of the laminated spacer layer, and some samples were partially insufficient in height without conforming to an intended height of 3.9±0.1 μm.

The liquid crystal desplay device was prepared as described in Example 1. The liquid crystal filling time was short and the liquid crystal display device was good in the alignment of liquid crystal, and since there were no spacers in the light transmitting regions, no light leak due to spacers occurred. However, since transparent electrodes were formed as the outmost surfaces of the spacers, some samples caused display defects due to the electric conduction between the color filter and the electrodes of the opposite substrate, because of the misalignment caused when the substrates were joined. In addition, samples partially insufficient in the spacer height in the substrate plane were uneven in picture quality Effect of the Invention The liquid crystal display device of this invention has a wide viewing angle since it has liquid crystal protrusions for controlling liquid crystal alignment. Furthermore, compared to the conventional divisionally aligned liquid crystal display devices, the step of spraying spacers is not required, and the spacers are formed simultaneously with protrusions for controlling liquid crystal alignment. In a preferable example of this invention, since the conventional black matrix is not required, excellent productivity and cost reduction can be achieved. Moreover, since stationary spacers are disposed on the black matrix, the light scattering by spacers and the display quality decline due to transmission are not caused, to ensure an excellent display quality. In addition, this invention is easy in patterning, high in processing accuracy, high in the freedom of degree of pattern design, fewer in the number of alignment steps for spacer formation, hence excellent also in productivity stability.

Furthermore, if portions of the protrusion for controlling liquid crystal alignment are formed also on the color-overlaid black matrix, the disorder of alignment on and near the color-overlaid black matrix can be prevented.

Moreover, if the material used to form the protrusion for controlling liquid crystal alignment is electrically insulating, the risk of electric short-circuit between the transparent electrodes on the color filter and the opposite electrode substrate can be avoided even if misalignment occurs when the substrates are joined.

What is claimed is:

1. A color filter comprising a transparent substrate with a black matrix, color layers of plural colors, a transparent electrode laminated in this order, a protrusion for controlling liquid crystal alignment, and plural spacers on the transparent electrode on the black matrix, the spacers being photolithographycally formed whereby the area of each spacer is 10 to 1500 square μm.

2. A color filter according to claim 1, wherein said color layers comprise at least three primary colors.

3. A color filter according to claim 1, wherein the spacers comprise a topmost layer of a composition same as that of the protrusion.

4. A color filter according to claim 1, wherein the color filter further comprises a black matrix.

5. A color filter according to claim 4, wherein a two-color-overlaid black matrix formed by partially overlapping color layers and a three-color-overlaid black matrix formed by partially overlapping color layers are provided, and the spacers are formed on the transparent electrode on the three-color-overlaid black matrix.

6. A color filter according to claim 4, wherein the black matrix is formed by partially overlapping two color layers and the spacers are formed on the transparent electrode on a two-color-overlaid black matrix.

7. A color filter according to claim 4, wherein the black matrix is formed by partially overlapping tow color layers and a topmost layer of the spacers is formed on the transparent electrode on a three-color-overlaid layer.

8. A color filter according to claims 5 to 7, wherein a topmost layer of the spacers is a portion of a layer comprising the protrusion.

9. A color filter according to claims 5 to 7, wherein a topmost layer of the spacers comprises separate dots of a composition same as that of the protrusion.

10. The color filter of claim 4, wherein the black matrix is formed by partially overlapping the color layers and a topmost layer of the spacers is selected from the group consisting of:
   (A) a portion of a layer comprising the protrusion for controlling liquid crystal alignment; and
   (B) separate dots of a composition same as that of the protrusion.

11. A color filter according to claim 1, wherein a material of the protrusion is an electric insulator.

12. A color filter according to claim 1, wherein the protrusion is made of a material with a pigment dispersed in a resin.

13. A color filter according to claim 12, wherein the pigment is an insulating white pigment.

14. A color filter according to claim 13, wherein the white pigment is at least one pigment selected from the group consisting of titanium oxide, silicon oxide, aluminum oxide, calcium carbonate, magnesium oxide, lead oxide, chromium oxide, iron oxide, zirconia and barium sulfate.

15. A color filter according to claim 1, wherein the protrusion is a photoresist.

16. A color filter according to claim 1, wherein the protrusion is a polyimide resin or acrylic resin.

17. A color filter according to claim 1, wherein a shape of the spacers is circular, elliptical or square with round angles.

18. A liquid crystal display device, characterized by using the color filter as set forth in any one of claims 1–7 and 11–17.

19. A color filter of claim 1, wherein said substrate, said color layers, said transparent electrode and said protrusion are laminated in this order.

20. A color filter according to claim 1, wherein said black matrix is formed by patterning a metal and/or a metal oxide.

21. A color filter according to claim 1, wherein said black matrix is formed by patterning a mixture consisting of a light-blocking agent and a resin.

22. A color filter according to claim 1, wherein said black matrix is formed by partially overlaying two or three color layers.

23. A method for producing a color filter of claim 1, comprising:
   laminating color layers of plural colors, transparent electrodes and a protrusion for controlling liquid crystal alignment in this order on a transparent substrate and providing fixed plural dot spacers,
   wherein the protrusion and a topmost layer of said spacers are simultaneously formed by using a same material.

* * * * *